(12) United States Patent
Yuda

(10) Patent No.: US 9,019,277 B2
(45) Date of Patent: Apr. 28, 2015

(54) CURVE-DIVIDING DEVICE, CURVE-DIVIDING METHOD, CURVE-DIVIDING PROGRAM AND INTEGRATED CIRCUIT

(75) Inventor: Masato Yuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 227 days.

(21) Appl. No.: 13/392,992

(22) PCT Filed: Jun. 14, 2011

(86) PCT No.: PCT/JP2011/003365
§ 371 (c)(1),
(2), (4) Date: Feb. 28, 2012

(87) PCT Pub. No.: WO2012/001893
PCT Pub. Date: Jan. 5, 2012

(65) Prior Publication Data
US 2012/0154406 A1 Jun. 21, 2012

(30) Foreign Application Priority Data
Jun. 30, 2010 (JP) ................................. 2010-149039

(51) Int. Cl.
*G06T 11/20* (2006.01)
*G06T 11/00* (2006.01)

(52) U.S. Cl.
CPC .................................... *G06T 11/203* (2013.01)

(58) Field of Classification Search
CPC ..... G06T 11/203; G06T 17/20; G06T 11/206; G06T 3/00; G06T 11/60; G06T 13/80; G06T 17/05; G06T 19/00; G08G 1/16; H04N 5/2259; H04N 5/2628; G01C 21/3638; G06F 17/30038; G06F 17/01
USPC ................................................ 345/442, 440
See application file for complete search history.

(56) References Cited

U.S. PATENT DOCUMENTS

| 5,900,884 | A | 5/1999 | Minami et al. |
| 7,015,917 | B2 * | 3/2006 | Uesaki et al. ................. 345/531 |
| 2005/0237325 | A1 * | 10/2005 | Motter et al. ................. 345/442 |
| 2007/0097123 | A1 * | 5/2007 | Loop et al. .................... 345/442 |

FOREIGN PATENT DOCUMENTS

| JP | 8-329261 | 12/1996 |
| JP | 11-15986 | 1/1999 |
| JP | 2010-146250 | 7/2010 |

OTHER PUBLICATIONS

International Search Report issued Jul. 12, 2011 in corresponding International Application No. PCT/JP2011/003365.

* cited by examiner

*Primary Examiner* — Jason M Repko
*Assistant Examiner* — F. M. Hossain
(74) *Attorney, Agent, or Firm* — Wenderoth, Lind & Ponack, L.L.P.

(57) ABSTRACT

A curve division device is provided enabling a multiprocessor system to perform effective curve division on Bézier curves. The curve division device comprises: N (N≥2, N being an integer) processor elements; a reception unit receiving curve information indicating a Bézier curve; a first execution unit causing the N processor elements to execute a division algorithm of taking the curve information as initial input data and repeatedly (i) generating two divided curves by dividing the Bézier curve indicated by the input data, (ii) selecting one of the divided curves according to the assigned setting value, and (iii) defining new input data indicating the divided curve selected for subsequent division, until the divided curve selected by each processor element is different; and a second execution unit causing each processor element to execute a determination algorithm of determining line segments approximating a divided curve resulting from the division algorithm.

12 Claims, 22 Drawing Sheets

PID=00

PID=01

PID=10

PID=11

(Originally PID=00)
(Originally PID=10)

(Originally PID=01)
(Originally PID=11)

PID=0

(Originally PID=00)

PID=1

(Originally PID=10)

PID=0

(Originally PID=01)

PID=1

(Originally PID=11)

CURVE-DIVIDING DEVICE, CURVE-DIVIDING METHOD, CURVE-DIVIDING PROGRAM AND INTEGRATED CIRCUIT

TECHNICAL FIELD

The present invention pertains to the field of dividing Bézier curves into straight line approximations, as performed by multiprocessor systems.

BACKGROUND ART

In computer graphics, a curve rendering function is a requirement for displaying vector content, such as outline fonts. In a conventional device, a text display function operates by displaying a row of fixed-size bitmaps, created in advance. However, modern CPU (Central Processing Unit) and LSI (Large Scale Integration) development has enabled bitmaps of arbitrary size to be created in real time from an outline font. An outline font expresses the shape of the characters through a collection of outlines and coordinates serving as reference points, and includes glyph data defining the shapes of the font. Glyph data are made up of a quadratic coordinate point sequence and commands defining the joints between points in the sequence. Font rendering is the process of rasterizing the glyph data. Rasterizing is the process of converting vector data into bitmap data. The vector data are numerical data expressing lines and curves.

TrueType fonts are a representative example of outline fonts. In a TrueType font, the commands are replaced by bits appended to each point so as to indicate whether the point is on the outline, or is a control point for a curve making up the outline. The bits respectively represent line segments and quadratic Bézier curves. That is, a control point on the outline of the font is interpreted as a line segment, while a point not on the outline of the font is interpreted as a quadratic Bézier curve. Accordingly, the font can be rendered by rasterizing line segments and quadratic Bézier curves. Rasterizing is the process of expressing characters and images handled by a computer as collections of small points that can be printed by a printer or displayed by a display device. One method for rasterizing quadratic Bézier curves involves approximating curve commands as a plurality of line segment approximations so as to process all commands as line segments.

The following is an explanation of Bézier curves. A Bézier curve is a parametric curve made up of a start point P0, a control point P1, and an end point P2, expressed using parameter t in Math. 1, below. Similarly, a cubic Bézier curve is made up of a start point P0, control points P1 and P2, and an end point, expressed in Math. 2, below.

$$P(t) = P0 \times (1-t)^2 + 2 \times P1 \times (1-t) \times t + P2 \times t^2$$

$$(0 \leq t \leq 1) \quad [\text{Math. 1}]$$

$$P(t) = P0 \times (1-t)^3 + 3 \times P1 \times (1-t)^2 \times t + 3 \times P2 \times (1-t) \times t^2 + P3 \times t^3$$

$$(0 \leq t \leq 1) \quad [\text{Math. 2}]$$

As shown in FIG. 19, the Bézier curve defined by points A, B, and C is divisible using midpoint D of line segment AB, midpoint E of line segment BC, and midpoint F of line segment DE into a Bézier curve defined by points A, D, and F (left-hand quadratic Bézier curve) and a Bézier curve defined by points F, E, and C (right-hand quadratic Bézier curve).

Furthermore, as also shown in FIG. 19, the left-hand quadratic Bézier curve is divisible into a Bézier curve defined by points A, G, and I, and a Bézier curve defined by points I, H, and F. Similarly, the right-hand quadratic Bézier curve is divisible into a Bézier curve defined by points F, J, and L, and a Bézier curve defined by points L, K, and C.

By increasing the number of divisions performed in this depthwise-recursive division until a certain level is reached, the lines joining the points are made to approximate the curve for rendering purposes. A determination regarding whether or not to recursively divide is performed once per division and is based on the degree of curvature. The curvature is reduced with each division. Accordingly, segments with curvature low enough to approximate straight lines are hardly ever divided, while segments with high curvature are divided several times so as to reduce the curvature. This enables smooth curve drawing. An example of a conventional recursive curve division method is given by a curve division device perdorming recursive curve division consecutively, using stack memory (e.g., Patent Literature 1).

CITATION LIST

Patent Literature

[Patent Literature 1]
Japanese Patent Application Publication No. H8-329261

SUMMARY OF INVENTION

Technical Problem

Patent Literature 1 has a CPU perform recursive division of a Bézier curve. However, given that the CPU must also realize other processing, the recursive curve division process cannot monopolize the CPU.

Therefore, the recursive curve division process may be performed by a multiprocessor system distinct from the CPU, such as a co-processor or a graphics processor consisting of a multiprocessor, or a graphical SIMD (Single-Instruction Multiple-Data) processor.

In such circumstances, each processor element making up the multiprocessor may perform recursive curve division processing on a different Bézier curve. However, this causes an uneven processing load to be placed on the processor elements, which may be problematic due to inefficiencies imposed on the multiprocessor system as a whole. This is because each processor element handles a different Bézier curve. When the Bézier curves differ in terms of curvature, a different number of recursive divisions is needed for each one.

Thus, the present invention aims to provide a curve division device, curve division method, curve division program, and integrated circuit enabling a multiprocessor system to perform effective curve division on Bézier curves.

Solution to Problem

In order to achieve the above-stated aim, the present invention provides a curve division device, comprising: at least N (N≥2, N being an integer) processor elements each having a different setting value assigned thereto; a reception unit receiving curve information indicating a Bézier curve from an outside source; a first execution unit causing each of the N processor elements to execute a division algorithm of taking the curve information as initial input data and repeatedly (i) generating two divided curves by dividing the Bézier curve indicated by the input data, (ii) selecting one of the two divided curves in accordance with the setting value assigned thereto, and (iii) defining new input data indicating the divided curve thus selected for subsequent division, until the divided curve selected by each of the N processor elements is different; and a second execution unit causing each of the N processor elements to execute a determination algorithm of determining one or more line segments approximating an ultimately selected divided curve resulting from the division algorithm.

Advantageous Effects of Invention

According to the above-described configuration, the curve division device causes N processor element to execute the division algorithm until each PE selects a different divided curve. As such, once execution is complete, the PEs have each selected a divided curve of lower curvature than the Bézier curve indicated in the initial input. Therefore, each PE determines one or more line segments approximating a low-curvature divided curve, thus preventing processing load imbalance. Accordingly, the curve division device is able to perform efficient division processing on Bézier curves within the multi-processor system.

BRIEF DESCRIPTION OF DRAWINGS

FIG. 3 shows the configuration of a processor element 22a.

FIG. 17 shows the configuration of a processor element 2022a.

DESCRIPTION OF EMBODIMENTS

1. Embodiment 1

Embodiment 1 of the present invention is described below, with reference to the accompanying drawings. The following description is given using a quadratic Bézier curve (hereinafter, Bézier curve).

1.1 Outline

Figure 1:
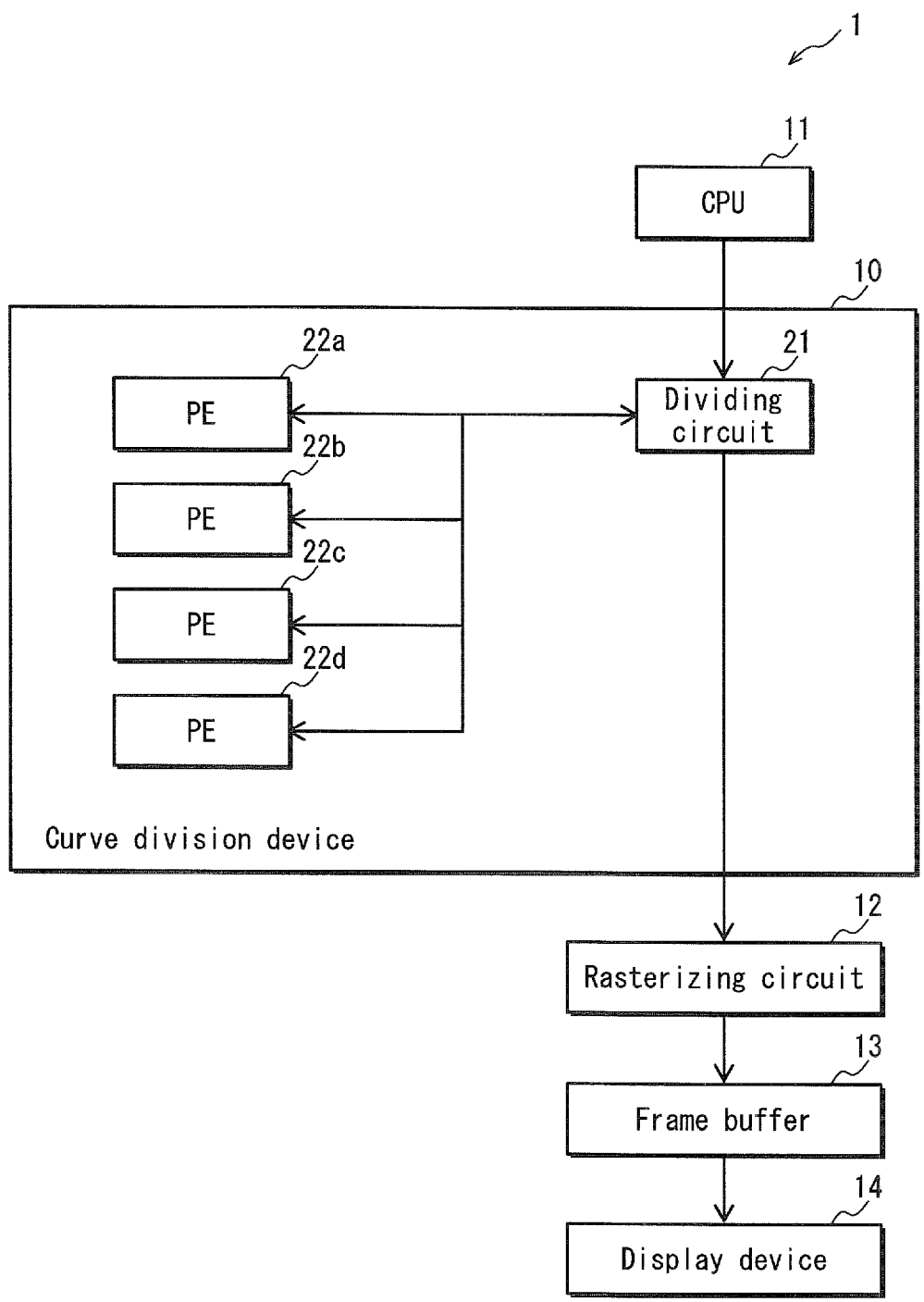
FIG. 1 is block diagram showing the configuration of an information processing device 1.

FIG. 1 is a block diagram illustrating the configuration of an information processing device 1 for Embodiment 1 of the present invention.

The information processing device 1 includes a curve division device 10, a central processing unit (CPU) 11, a rasterizing circuit 12, a frame buffer 13, and a display device 14.

The CPU 11 outputs a command to the curve division device 10 indicating whether a display object is a Bézier curve or a line segment, along with curve information or line segment information corresponding thereto. The curve information is made up of a start point, an end point, and a control point specifying the Bézier curve. Similarly, the line segment information is made up of a start point and an end point specifying the line segment.

Upon receiving the curve information from the CPU 11, the curve division device 10 determines a set made up of one or more line segments that approximate the Bézier curve indicated by the curve information.

The rasterizing circuit 12 generates rendering information for rendering the one or more line segments so determined, and stores the rendering information in the frame buffer 13.

The display device 14 displays the one or more line segments in accordance with the rendering information stored in the frame buffer 13. Thus, an approximation of the Bézier curve indicated by the curve information output by the CPU 11 is displayed.

1.2 Configuration

The following describes the configuration of the curve division device 10 pertaining to the present invention.

As shown in FIG. 1, the curve division device 10 is a multiprocessor system having a dividing circuit 21 and processor elements (PE) 22a through 22d.

In the present Embodiment, the curve division device 10 has a SIMD configuration. In a SIMD-configured multiprocessor, all processor elements reference a common program counter in common μ-code (a program executed by each processor element).

(1) Dividing Circuit 21

Figure 2:
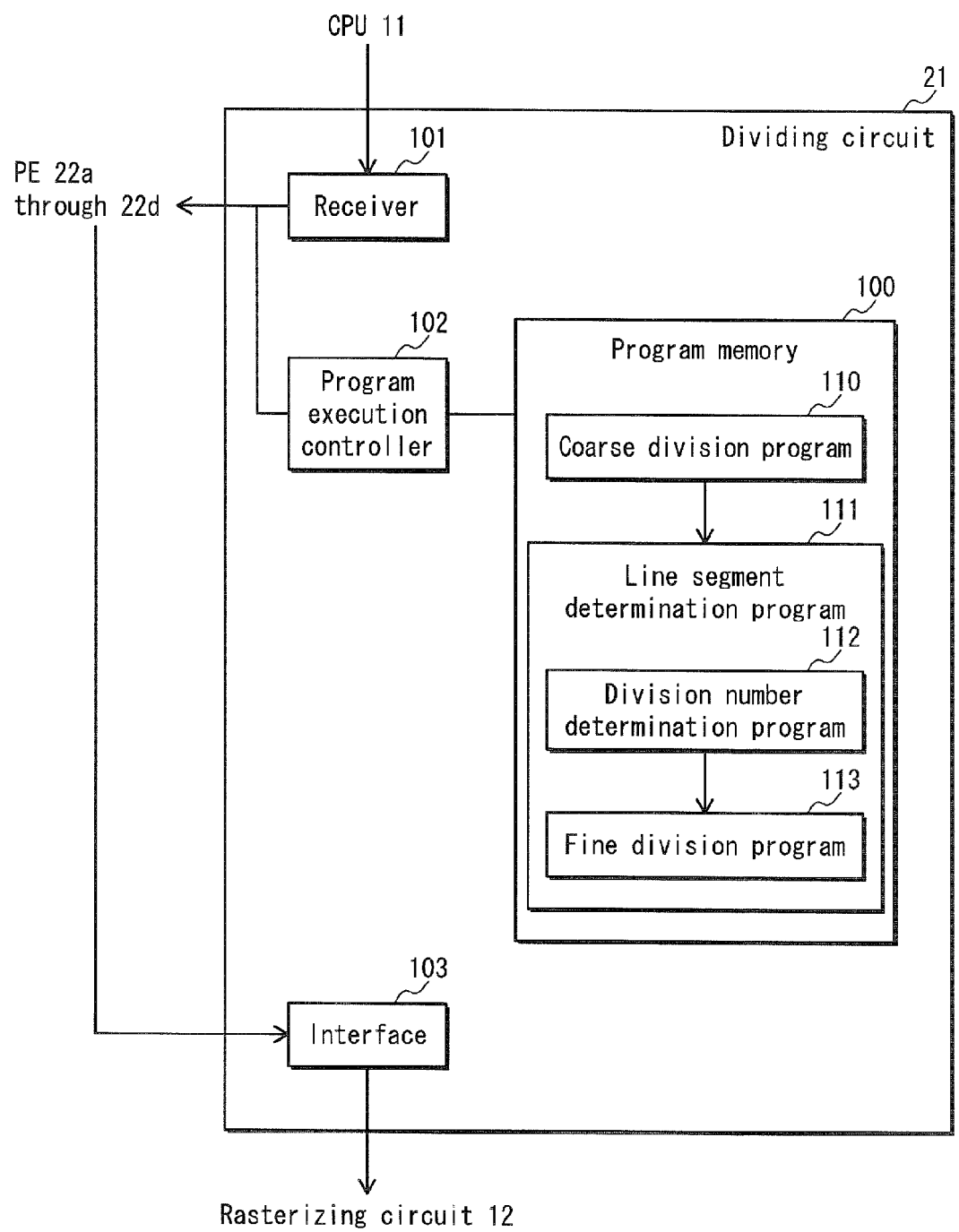
FIG. 2 shows the configuration of a dividing circuit 21.

As shown in FIG. 2, the dividing circuit 21 includes a program memory 100, a receiver 101, a program execution controller 102, and an interface 103.

(1-1) Program Memory 100

The program memory 100 includes a coarse division program 110 and a line segment determination program 111. The coarse division program 110 and the line segment determination program 111 are executed by the PEs 22a through 22d.

(Coarse Division Program 110)

The coarse division program 110 takes the curve information received from the CPU 11 as initial input data, divides the curve indicated by the input data to generate two divided curves, selects one of the two divided curves according to predetermined information, and determines input data representing the divided curve so selected. The coarse division program 110 repeats the division and selection until a different divided curve is selected by each processor element 22a through 22d. The predetermined information is an ID assigned to each PE for identification.

The detailed functional operations performed when the coarse division program is executed are described later.

(Line Segment Determination Program 111)

The line segment determination program 111 determines one or more line segments that approximate each of the divided curves ultimately selected through the execution of the coarse division program 110. As shown in FIG. 2, the line segment determination program 111 is made up of a division number determination program 112 and a fine division program 113.

The division number determination program 112 determines the number of divisions to be performed according to the curvature of the divided curve.

The fine division program 113 divides each divided curve, making the appropriate number of divisions determined according to the curvature thereof so as to determine a line segment approximating the divided curve.

The details of the functional operations performed in the execution of the division number determination program and the fine division program are described later.

(1-2) Receiver 101

Upon receiving the curve information from the CPU 11 indicating the Bézier curve, the receiver 101 outputs the curve information to the PEs 22a through 22d.

(1-3) Program Execution Controller 102

The program execution controller 102 causes the PEs 22a through 22d to execute a coarse division algorithm realized through the coarse division program 110 and a line segment determination algorithm realized through the line segment determination program 111. The program execution controller 102 causes the PEs 22a through 22d to execute the coarse division program 110 and the line segment determination program 111 in the stated order. Furthermore, within the line segment determination program 111, the program execution controller 102 causes the PEs 22a through 22d to execute the division number determination program 112 and the fine division program 113 in the stated order.

Specifically, the program execution controller 102 causes the PEs 22a through 22d to execute the coarse division algorithm by outputting instructions making up the coarse division program 110 thereto. Similarly, the program execution controller 102 causes the PEs 22a through 22d to execute the line segment determination algorithm by outputting instructions making up the division number determination program 112 and the fine division program 113 thereto.

(1-4) Interface 103

Upon receiving, from the PEs 22a through 22d, one or more line segments obtained by executing the line segment determination program 111, the interface 103 outputs the line segments to the rasterizing circuit 12.

(2) PEs 22a through 22d

The following describes the PEs 22a through 22d. Given that the PEs 22a through 22d are identically configured, the following describes PE 22a, only.

Figure 3:
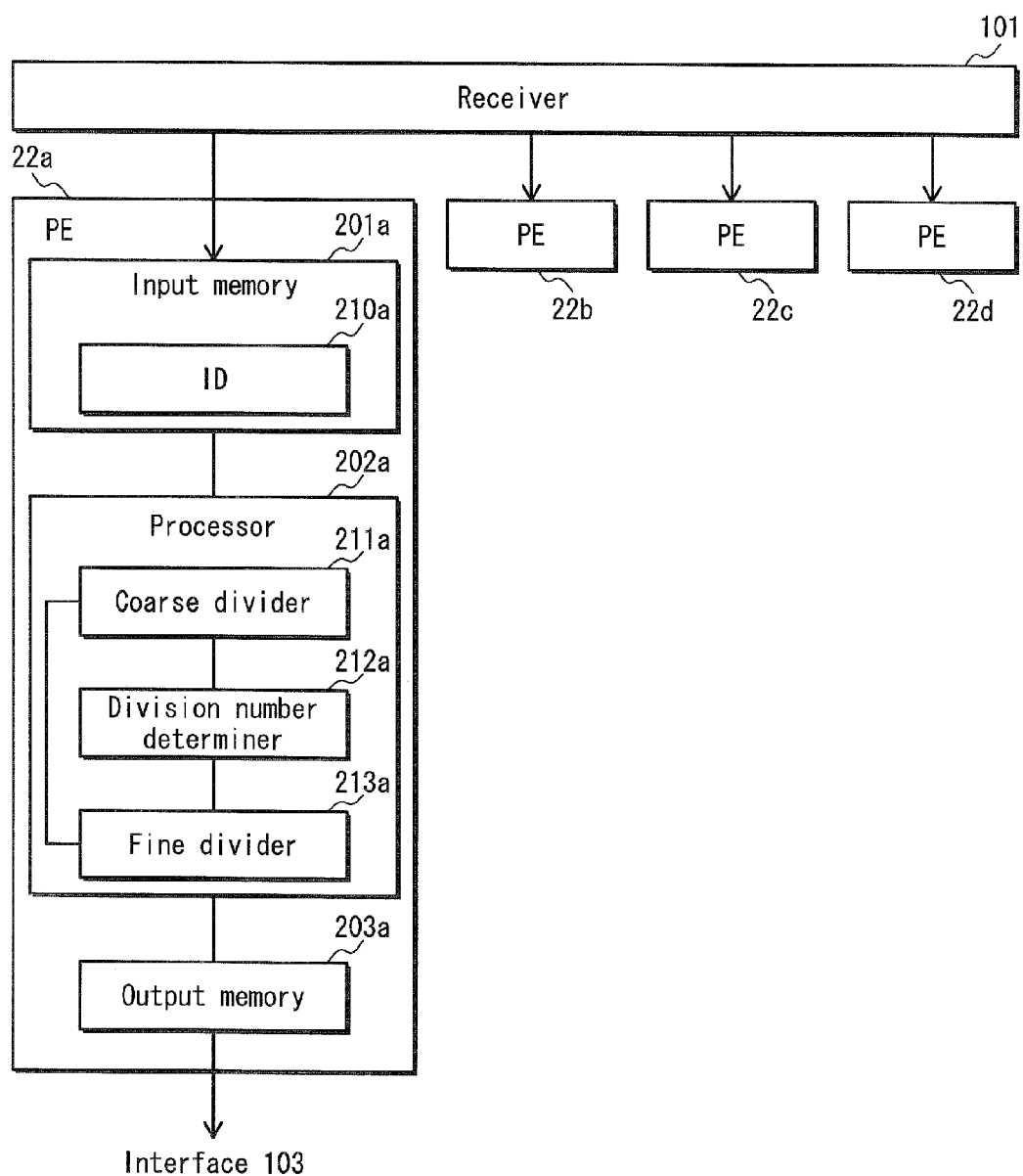

FIG. 3 illustrates the configuration of the PE 22a. As shown, the PE 22a includes an input memory 201a, a processor 202a, and an output memory 203a.

(2-1) Input Memory 201a

The input memory 201a is a register that includes an area for storing an ID 210a that identifies the PE 22a and an area for storing input data required in order to process the µ-code.

For example, the input memory 201a stores the curve information output from the receiver 101 of the dividing circuit 21. The register of the input memory 201a storing the curve information is overwritten with the curve information indicating the divided curve selected by executing the coarse division program (identical to the above-described input data).

In the present Embodiment, the input memory 201a is memory referenced by the receiver 101 and by the PE 22a itself, but that cannot be referenced by the other PEs 22b through 22d, nor can the other PEs output the content thereof. That is, in the present Embodiment, the processor elements do not exchange data.

(2-2) Processor 202a

The processor 202a executes the program instructions output by the program execution controller 102.

Specifically, the processor 202a includes a coarse divider 211a, a division number determiner 212a, and a fine divider 213a as functional components.

(Coarse Divider 211a)

The coarse divider 211a is a functional component executing coarse division program 110 instructions as output by the program execution controller 102.

The following describes the operations of the coarse division program 110 as executed.

For every division of an input curve made by executing the coarse division program 110, the coarse divider 211a selects one of the two resulting curves as a new input curve, making the selection according to the ID of the PE 22a. The coarse divider 211a then performs a recursive process whereby the previously-stored curve information is overwritten with new curve information indicated by the new input curve, ultimately arriving at a coarse divided curve (also herein, divided curve). The coarse divider 211a then outputs the curve information indicated by the coarse divided curve to the division number determiner 212a and the fine divider 213a.

(Division Number Determiner 212a)

The division number determiner 212a is a functional component executing division number determination program 112 instructions as output by the program execution controller 102. The division number determiner 212a executes the division number determination program 112 to determine a number of divisions to be made on the coarse divided curve received from the coarse divider 211a according to at least one of a fixed value and coordinates of a point on the curve.

The following describes the operations of the division number determination program 112 as executed.

The division number determiner 212a makes a determination as to whether or not the line segment joining the start point and end point of the coarse divided curve sufficiently approximates the coarse divided curve. In the present Embodiment, the division number DIV is determined using the coordinates of the start point, control point, and end point of the Bézier curve.

Specifically, the division number determiner 212a may compute DIVF according to the below-inscribed Math. 3 and convert the result to an integer for use as the division number DIV.

$$DIVF = \mathrm{Max}(\mathrm{Abs}(((X0-1)+(X2-X1))/4, \mathrm{Abs}(((Y0-Y1)+(Y2-Y1))/4)) \quad [\text{Math. 3}]$$

The result may be converted to an integer value by rounding up, rounding down, or rounding to the nearest integer. The division number determination program 112 includes an instruction for storing Math. 3 and for converting the value of DIVF for storage as the division number DIV.

The division number determiner 212a transfers the calculated division number DIV to the fine divider 213a, i.e., passes the division number DIV to the fine division program 113.

(Fine Divider 213a)

The fine divider 213a is a functional component executing fine division program 113 instructions as output by the program execution controller 102. The fine divider 213a divides the coarse divided curve into line division approximations in accordance with the division number determined by the division number determiner 212a.

The following describes the operations of the fine division program 113 as executed.

The fine divider 213a uses the coarse divided curve generated by the coarse divider 211a and the division number corresponding thereto as calculated by the division number determiner 212a to divide the coarse divided curve into the number of line segment approximations given by the division number. In the present Embodiment, the division into line segment approximations is performed by obtaining the number of points on the coarse divided curve given by the division number and generating line segments connecting each of the points so obtained.

Generally, the coordinate points of a quadratic Bézier curve are given using a parameter t ($0 \leq t \leq 1$) expressible by a parametric equation such as that given in Math. 1, above. Here, the coordinate points of the quadratic Bézier curve are given as P(t), made up of the start point P0 (X0, Y0), the control point P1 (X1, Y1), and the end point P2 (X2, Y2).

Math. 4 is derived from Math. 1 by conversion into polynomial t.

$$P(t) = (P0 - 2 \times P1 + P2) \times t^2 + 2 \times (P1 - P0) \times t + P0 \quad \text{[Math. 4]}$$
$$= L \times t^2 + M \times t + N$$
$$(L = P0 - 2 \times P1 + P2, M = 2 \times (P1 - P0), N = P0)$$

This expression is used by the fine divider 213a.

For example, given a division number n, the fine divider 213a generates a line segment connecting the start point P0 and point P(1/n), a line segment connecting point P(1/n) and point P(2/n), and so on, until generating a line segment joining point P((n−1)/n) and point P(1).

(2-3) Output Memory 203a

The output memory 203a includes an area for storing information to be output to the interface 103 of the dividing circuit 21.

Specifically, after the fine division program 113 is executed by the fine divider 213a, the output memory 203a stores information concerning one or more line segments obtained thereby (e.g., information concerning the start points and end points).

(3) Input Memory Specifics

The following describes a specific example of the input memory 201a through 201d of the PEs 22a through 22d.

Figure 4:
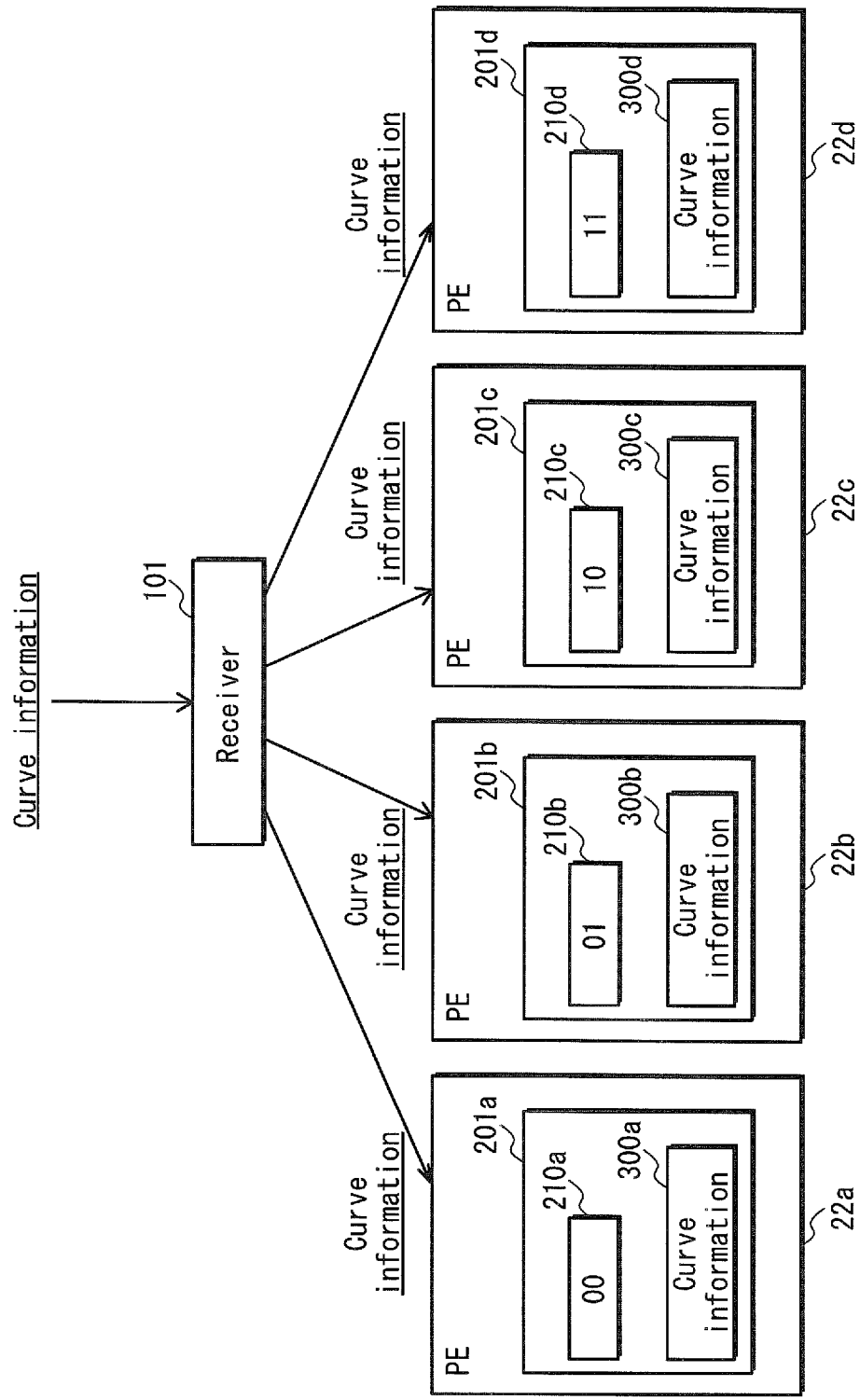
FIG. 4 illustrates a specific example of input memory 201a through 201d.

As described above, the input memory 201a through 201d of each PE 22a through 22d has an area for storing an ID identifying the PE. As shown in FIG. 4, each input memory 201a through 201d respectively stores ID 00, 01, 10, or 11.

Before the execution of the coarse division program 110, each input memory 201a through 201d receives and stores the curve information output from the CPU 11 and received from the receiver 101 of the dividing circuit 21. That is, as shown in FIG. 4, each input memory 201a through 201d stores identical curve information when coarse division program 110 execution begins.

1.3 Operations

The following describes the operations of the curve division device 10.

(1) Coarse Division Process Operations

The following describes the operations of the coarse division process performed by the processor elements (PEs) 22a through 22d executing μ-code (the coarse division program 110) to divide the input quadratic Bézier curve. The description is given with reference to the flowchart of FIG. 5. For convenience, the registers indicating the coordinates are assumed to handle two-dimensional vectors.

Given that the operations of the PEs 22a through 22d are identical, the following explanation centers on PE 22a.

The coarse divider 211a of PE 22a copies the start point, control point, and end point of the Bézier curve indicated by the curve information to registers A, B, and C, in accordance with the curve information received from the receiver 101 of the dividing circuit 21. The coarse divider 211a then initializes a COUNT register counting a number of divisions to one (step S5).

The coarse divider 211a sets a CMAX register to a repetition count (step S10). Given that a different coarse divided curve is assigned to each processor element, the repetition count should be the base-two logarithm of the number of processor elements. The present Embodiment involves four processor elements. Therefore, the CMAX register is set to two.

The coarse divider 211a calculates the midpoint of line segment AB defined by register A (the start point) and register B (the control point), setting register D accordingly, and calculates the midpoint of line segment BC defined by register B (the control point) and register C (the end point), setting register E accordingly (step S15).

The coarse divider 211a then calculates the midpoint of line segment DE defined by the point indicated in register D and the point indicated in register E, setting register F accordingly (step S20).

The coarse divider 211a determines whether or not the least-significant bit of the PE 22a ID is a one (step S25). In the affirmative case (Yes in step S25), the coarse divider 211a overwrites register A with the value of register F (step S30). In the negative case (No in step S25), the coarse divider 211a overwrites register C with the value of register F (step S35).

The coarse divider 211a again determines whether or not the least-significant bit of the PE 22a ID is a one (step S40). In the affirmative case (Yes in step S40), the coarse divider 211a overwrites register B with the value of register E (step S45). In the negative case (No in step S40), the coarse divider 211a overwrites register B with the value of register D (step S50).

The coarse divider 211a determines whether the value in the COUNT register is less than the value of the CMAX register (step S55).

In the affirmative case (Yes in step S55), the coarse divider 211a increments the COUNT register and shifts the ID one bit to the right (step S60). The right-shift of the ID is performed so that registers A, B, and C of each processor element come to be assigned different content, i.e. a different Bézier curve-defining start point, control point, and end point. When value of the CMAX register is the base-two logarithm of the number of processor elements, the least-significant bit of the ID used each time steps S25 through S50 are executed is shifted one bit to the right with each division. As a result, different points are assigned to registers A, B, and C of each PE. While the above example discusses a right-shift of one bit, the position and direction of the shift is clearly dependent on the method used to distinguish between processor elements.

(2) Coarse Division Process: Concrete Example

The following describes a concrete example of the coarse division processing performed by the PEs 22a through 22d.

(Case A: COUNT value of 1)

Figure 5:
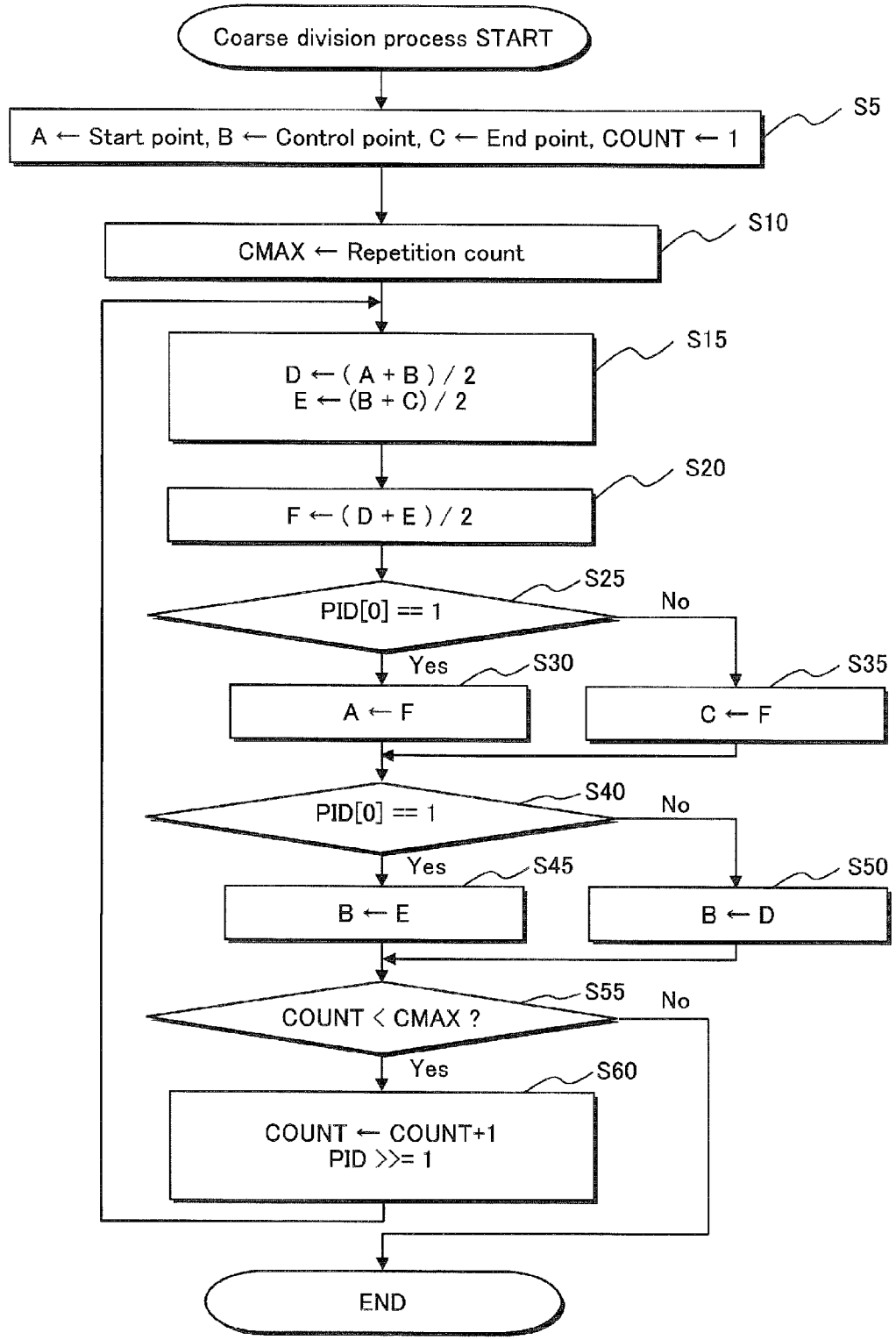
FIG. 5 is a flowchart indicating the operation of a coarse division process.
Figure 6:
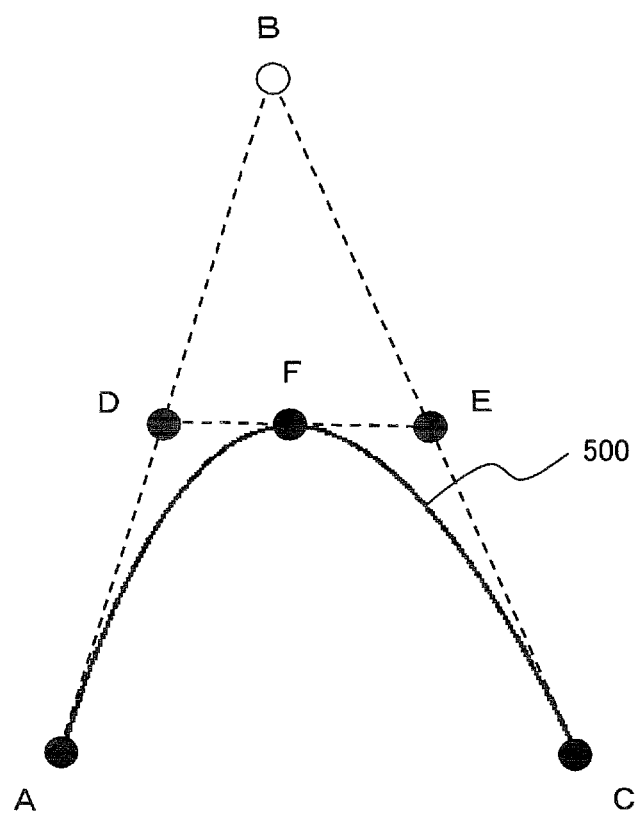
FIG. 6 illustrates a specific example of the coarse division process, specifically the initial state before division.

By executing step S5 from FIG. 5, the PEs 22a through 22d set the respective registers to start point A, control point B, and end point C included in the curve information indicated by the Bézier curve 500, illustrated by FIG. 6, and received from the receiver 101 of the dividing circuit 21.

By executing steps S15 and S20, the PEs 22a through 22d calculate points D, E, and F, indicated in FIG. 6.

Figure 7A:
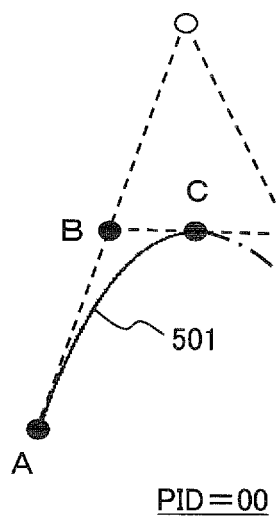
FIGS. 7A through 7D illustrate the specific example of the coarse division process, specifically the state of a divided curve as selected after one division.

After calculating points D, E, and F, the PEs 22a through 22d execute the remaining steps, up to and including step S50. In this case, the ID of PE 22a is 00. Thus, step S35 is executed after the determination of step S25, and step S50 is executed after the determination of step S40. Therefore, points D and F indicated in FIG. 6 respectively become points B and C. The results are illustrated in FIG. 7A.

Figure 7B:
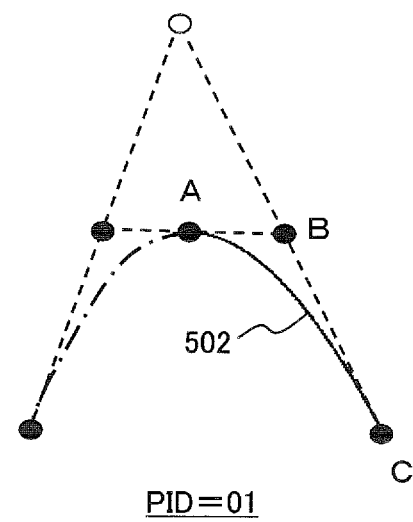

Similarly, the ID of PE 22b is 01. Thus, step S30 is executed after the determination of step S25, and step S45 is executed after the determination of step S40. Therefore, points E and F indicated in FIG. 6 respectively become points B and A. The results are illustrated in FIG. 7B.

Figure 7C:
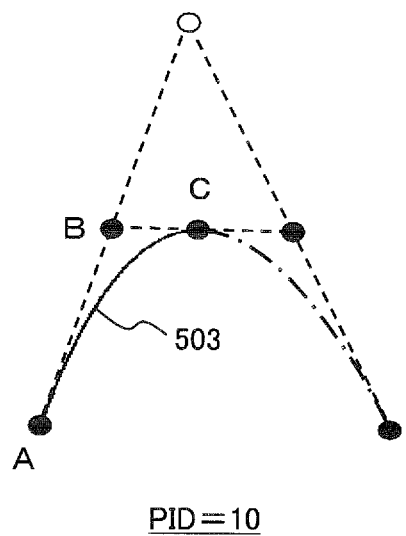

The ID of PE 22c is 10, with a least-significant bit of zero. Therefore, the operations of PE 22c are identical to those of PE 22a, such that points D and F indicated in FIG. 6 respectively become points B and C. The results are illustrated in FIG. 7C.

Figure 7D:
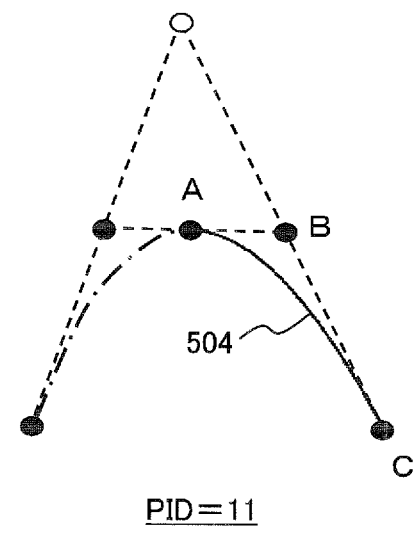

The ID of PE 22d is 11, with a least-significant bit of one. Therefore, the operations of PE 22d are identical to those of PE 22b, such that points E and F indicated in FIG. 6 respectively become points B and A. The results are illustrated in FIG. 7D.

Subsequently, the PEs 22a through 22d execute steps S55 and S60, the COUNT value is incremented to two, and each ID is shifted one bit to the right.

(Case B: COUNT value of 2)

Figure 8A:
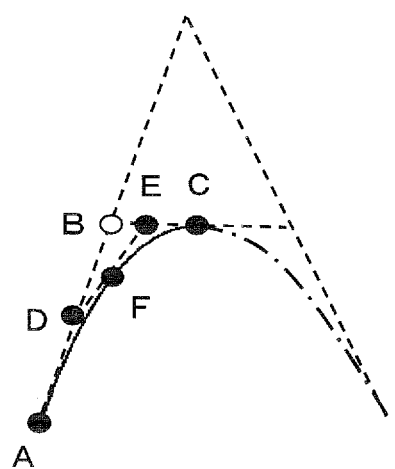
FIGS. 8A and 8B illustrate the specific example of the coarse division process, specifically the initial conditions before a second division.
Figure 8B:
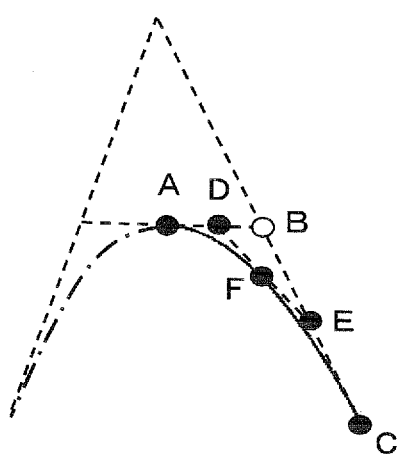

By executing steps 15 and S20, the PEs 22a through 22d calculate points D, E, and F on the divided curve selected in Case A, as indicated in FIGS. 8A and 8B. FIG. 8A applies to PEs 22a and 22c while FIG. 8B applies to PEs 22b and 22d.

After calculating points D, E, and F, the PEs 22a through 22d execute the remaining steps, up to and including step S50.

Figure 9A:
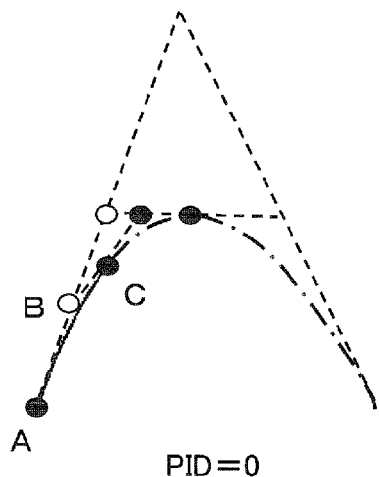
FIGS. 9A through 9D illustrate the specific example of the coarse division process, specifically the state of the divided curve as selected after two divisions.

Given that the ID of PE 22a has a right-shifted least significant bit of zero, step S35 is executed after the determination of step S25, and step S50 is executed after the determination of step S40. Therefore, points D and F indicated in FIG. 8A respectively become points B and C. The results are illustrated in FIG. 9A.

Figure 9B:
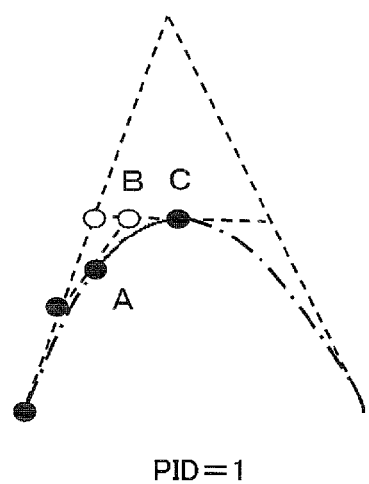

Similarly, given that the ID of PE 22c has a right-shifted least significant bit of one, step S30 is executed after the determination of step S25, and step S45 is executed after the determination of step S40. Therefore, points E and F indicated in FIG. 8 respectively become points B and A. The results are illustrated in FIG. 9B.

Figure 9C:
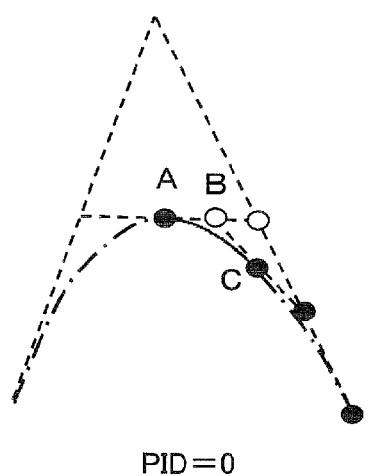

Given that the ID of PE 22b has a right-shifted least significant bit of zero, step S35 is executed after the determination of step S25, and step S50 is executed after the determination of step S40. Therefore, points D and F indicated in FIG. 8B respectively become points F and C. The results are illustrated in FIG. 9C.

Figure 9D:
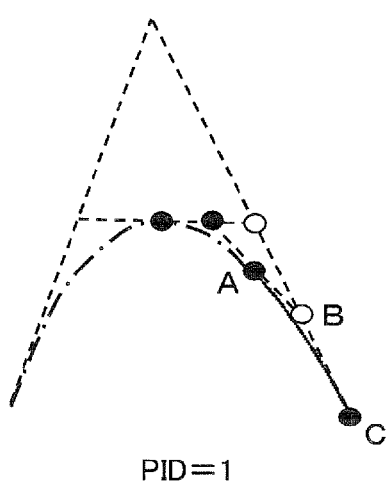

Given that the ID of PE 22d has a right-shifted least significant bit of one, step S30 is executed after the determination of step S25, and step S45 is executed after the determination of step S40. Therefore, points E and F indicated in FIG. 8B respectively become points B and A. The results are illustrated in FIG. 9D.

The PEs 22a through 22 then execute step S55, thus completing the process.

According to the above, the PEs 22a through 22d are each able to select a different divided curve, as shown in FIGS. 9A through 9D. Specifically, the PEs 22a through 22d are each able to select curve information indicating a different divided curve.

The coarse divider of each PE 22a through 22d is able to utilize the recursive divisibility of the Bézier curve and the simultaneous processing capability of SIMD processors to simultaneously divide the Bézier curve input by the CPU 11 as the initial input curve and assign a different region of the divided curve to each processor element, by employing the PE ID of the coarse divider performing the division.

(3) Fine Division Process Operations

The following describes the operations of the fine division process performed by processor elements (PE) 22a through 22d executing u-code (the line segment determination program 111), particularly the fine division program 113. The description is given with respect to the flowchart of FIG. 10. For convenience, the registers indicating the coordinates are assumed to handle two-dimensional vectors.

Given that the operations of the PEs 22a through 22d are identical, the following explanation centers on PE 22a. Also, the value of the division number DIV is determined through the execution of the division number determination program 112 by the division number determiner 212a.

The fine divider 213a sets the register for storing the increase in parameter t from Math. 4 to 1/DIV, initializes register PT storing parameter t at 0, and calculates coefficients L, M, and N of the parametric expression using registers A, B, and C, setting each register appropriately (step S100).

The fine divider 213a stores t×t, i.e., PT×PT in register PT2, then calculates L×PT2+M×PT+N using the values of registers PT, PT2, L, M, and N and stores the result in register C (step S105).

The fine divider 213a determines whether or not the value in register PT is zero (step S110).

In the negative case (No in step S110), the fine divider 213a generates a line segment having a start point at the coordinates indicated in register P and an end point at the coordinates indicated in register C (step S115).

The fine divider 213a sets register P to the value of register C and adds the t increment DT to parameter PT (step S120).

Next, the fine divider 213a determines whether or not the new parameter PT is equal to or less than one (step S125). In the affirmative case (Yes in step S125), the process returns to step S105. In the negative case (No in step S125), the process ends.

When the value in register PT is zero (Yes in step S110), the process by the fine divider 213a proceeds to step S120 and continues thereafter.

(4) Fine Division Process: Concrete Example

The following describes a concrete example of the fine division process performed by PE 22a. PE 22a selects the Bézier curve (coarse divided curve) illustrated in FIG. 9A through the functional operations of the above-described coarse divider 211a.

Figure 11:
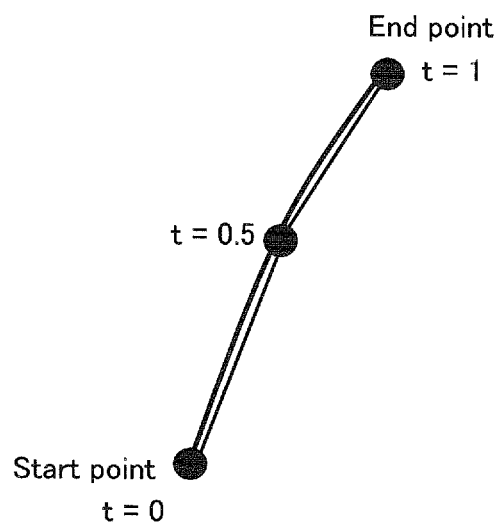
FIG. 11 illustrates a determination of line segment approximations when a fine divided curve is divided in two.

The range of possible values for parameter t of the Bézier curve is from zero to one, inclusive. Thus, the section should be divided into the number of divisions. For example, when the number of divisions is two as shown in FIG. 11, the curve may be divided into two sections, one from 0 to 0.5 (=1/2) and one from 0.5 to 1 (=2/2). In other words, the line segment in the section spanning t values 0 to 0.5 links point P(0) to point P(0.5), and the line segment in the section spanning t values 0.5 to 1 links point P(0.5) to point P(1). The two line segments are thus line segment approximations of the Bézier curve illustrated in FIG. 9A.

Figure 10:
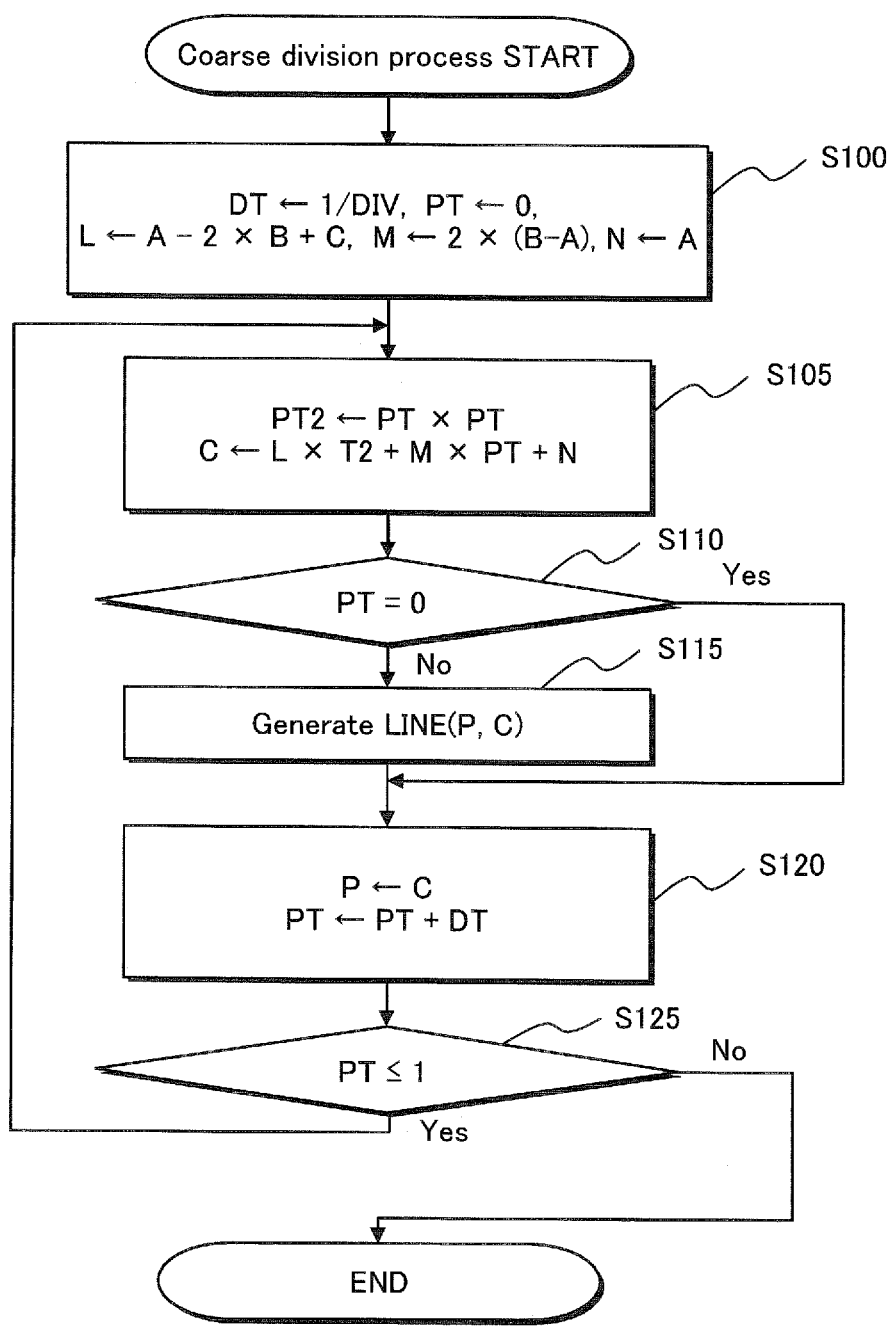
FIG. 10 is a flowchart indicating the operation of a fine division process.

While the above-described operations discuss the number of divisions as being two or greater, the flowchart of FIG. 10 can obviously be skipped without problem when the number of divisions is one. This is because generating one line segment spanning t values 0 to 1 is synonymous with generating a line segment from the start point to the end point of the Bézier curve (the coarse divided curve) and simply means that the line segment joins the start point to the end point.

Figure 12:
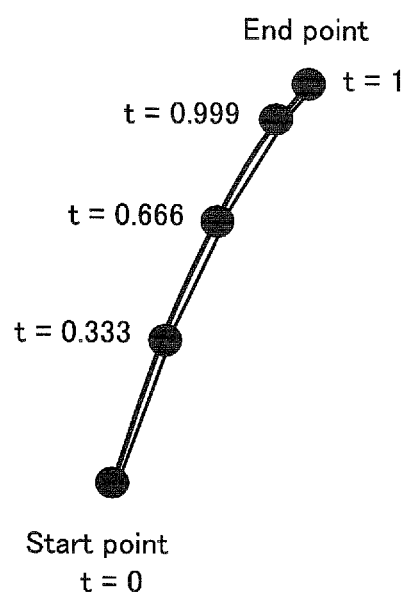
FIG. 12 illustrates a determination of line segment approximations when a fine divided curve is divided in three.

Also, the flowchart of FIG. 10 indicates that register DT is set to the inverse of the division number DIV during step S100. However, when this inverse value is not divisible within the allowed number of bits for the operation, then the value register PT never reaches one, despite the addition of the value of register DT thereto in step S120. In such cases, DIV+1 line segments are generated. For example, when the division number DIV is three, the parameter t increase is the inverse of 3, i.e., is non-divisible and truncated to 0.333. Thus even after adding the value of register DT to register PT DIV (=3) times, no line segment approximation is generated spanning t values 0.999 to 1 despite being generated for t values 0 to 0.333, 0.333 to 0.666, and 0.666 to 0.999. Thus, when the inverse value is not divisible into the value of the allowed number of bits, one more line segment approximation is generated than the division number indicates. Specifically, four line segment approximation are generated, namely for t values 0 to 0.333, 0.333 to 0.666, 0.666 to 0.999, and 0.999 to 1 (see FIG. 12). However, when the inverse calculation of the division number is not divisible within the allowed number bits, PT may be forcibly made to equal one when calculating the final section, without recourse to the register PT. In other words, when the division number is three, the processing indicated in the flowchart of FIG. 10 to calculate the final section involves adding DT=0.333 to PT=0.666 for a result of PT=0.999. However, when the number of generated line segment approximations is counted in steps S110 and S115 of FIG. 10, the process may be modified to set PT=1 when the counted division number is DIV−1 and is not divisible within the allowed number bits.

1.4 Conclusion

As explained above, the present Embodiment features the coarse divider 211a dividing a Bézier curve input thereto (the Bézier curve output by the CPU 11 as the initial value) into a number of divisions matching the number of PEs, followed by the division number determiner 212a determining a number of divisions corresponding to the divided curve.

The following results are obtained thereby.

The larger the area of a triangle defined by the start point, control point, and end point making up the Bézier curve, and the greater the number of high-curvature areas, the greater the number of small line segments that must be generated to smoothly draw the Bézier curve. As such, the division number determiner 212a handles a coarse divided curve pre-divided by the coarse divider 211a, rather than the Bézier curve output by the CPU 11. The greater the number of PEs, the lower the curvature of the curves into which the division number determiner 212a divides the coarse divided curve handled thereby. Therefore, a line segment joining the start point and the end point is more likely to sufficiently approximate the coarse divided curve, and further division by the fine divider 213a is less likely to be required.

Also, according to the present Embodiment, each processor element is assigned a curve as a processing target unit while the coarse divider 211a divides the curve into a plurality of coarse divided curves having low curvature. In later stages, fine division is performed upon determining the necessity of further division of the coarse divided curves. Thus, the parallelism of the processor elements is put to use for the coarse division of the curves while processing target curves are simultaneously allocated to each processor element. This enables the fine division process, which is not suited to multiprocessors, to be minimized while quickly providing small line segments that approximate the Bézier curve.

2. Embodiment 2

Embodiment 2 of the present invention is described below, with reference to the accompanying drawings. The following explanation centers on points of difference from Embodiment 1.

All devices, circuits, and components identical to those of Embodiment 1 use the same reference numbers thereas.

2.1 Configuration

Figure 13:
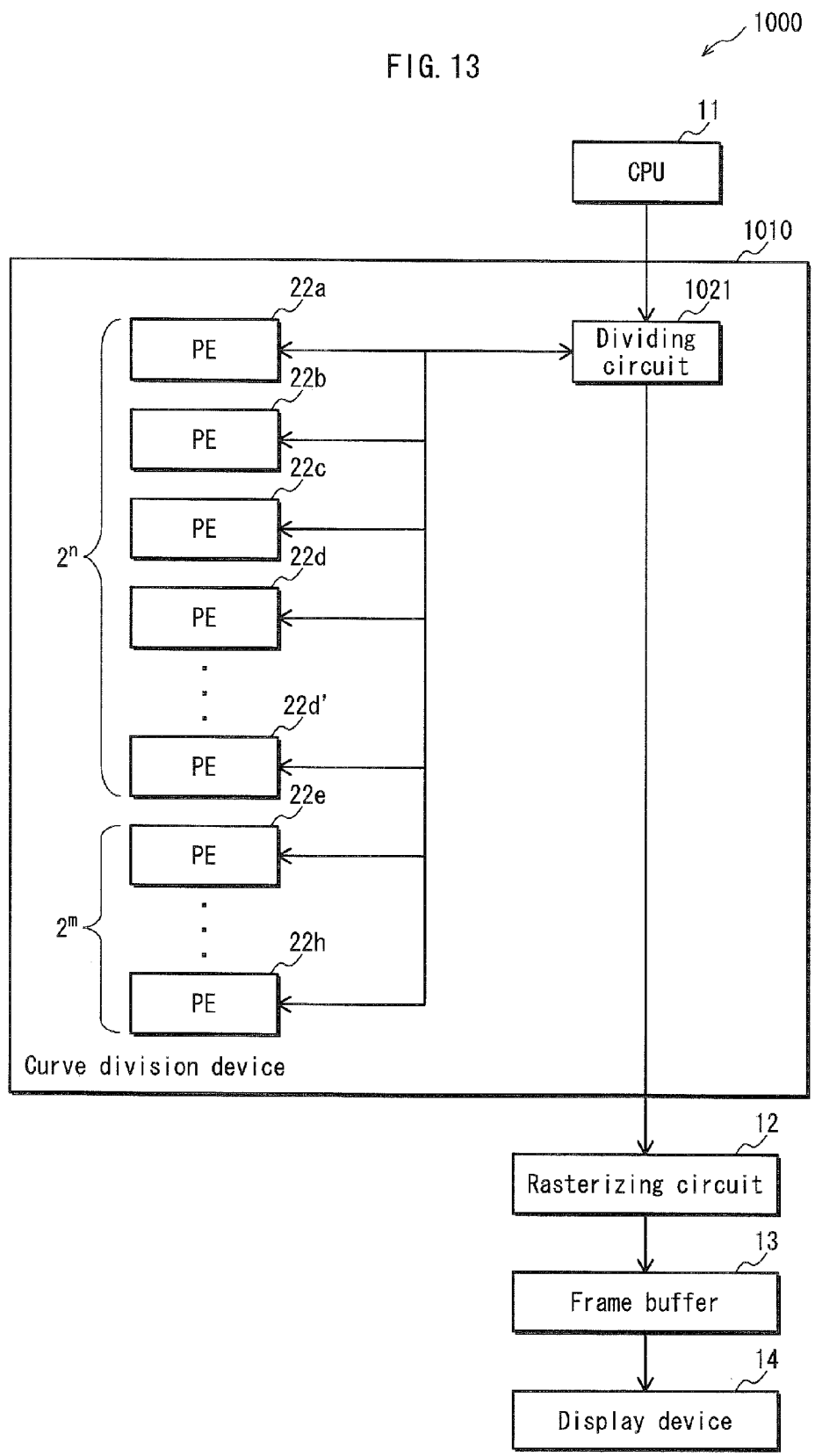
FIG. 13 is block diagram showing the configuration of an information processing device 1000.

FIG. 13 is a block diagram illustrating the configuration of an information processing device 1000 pertaining to Embodiment 2 of the present invention.

The information processing device 1000 includes a curve division device 1010, the CPU 11, the rasterizing circuit 12, the frame buffer 13, and the display device 14. In the present Embodiment, the curve division device 10 has a SIMD configuration identical to that of Embodiment 1.

The points of difference from Embodiment 1 are found in the functional operations of the curve division device 1010.

The following describes the operations of the curve division device 1010.

The curve division device 1010 is configured similarly to the curve division device 10 of Embodiment 1, but differs therefrom in the number of PEs and in the operations of the receiver. All other functional components thereof are identical to those of Embodiment. Thus, in the following explanation, the reference numbers from Embodiment 1 are used as needed.

As shown in FIG. 13, the curve division device 1010 includes a total of $2^n+2^m$ PEs (PEs 22a, 22b, 22c, 22d . . . 22d', 22e' . . . through 22h).

The configuration and functional operations of each PE are identical to the configuration and functional operations described in Embodiment 1 and therefore omitted. In the following example, n=m=2. That is, there are eight PEs in total.

Figure 14:
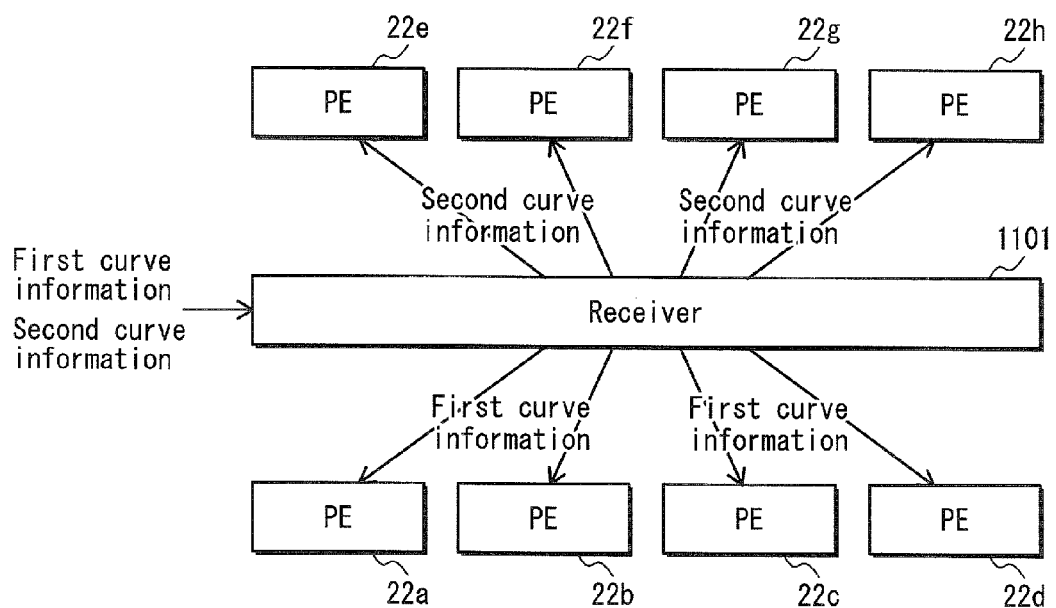
FIG. 14 shows the allocation of first curve information and second curve information.

As shown in FIG. 14, the receiver 1101 pertaining to Embodiment 2 receives first curve information and second curve information from the CPU 11, indicating two different Bézier curves. The receiver 1101 outputs the first curve information to four of the PEs (PEs 22a through 22d) and the second curve information to the remaining four PEs (PEs 22e through 22h).

Subsequently, PEs 22a through 22d take the first Bézier curve indicated by the first curve information as initial input and operate as described in Embodiment 1, each ultimately selecting a different divided curve. Similarly, PEs 22e through 22h take the second Bézier curve indicated by the second curve information as initial input and operate as described in Embodiment 1, each ultimately selecting a different divided curve.

Figure 15:
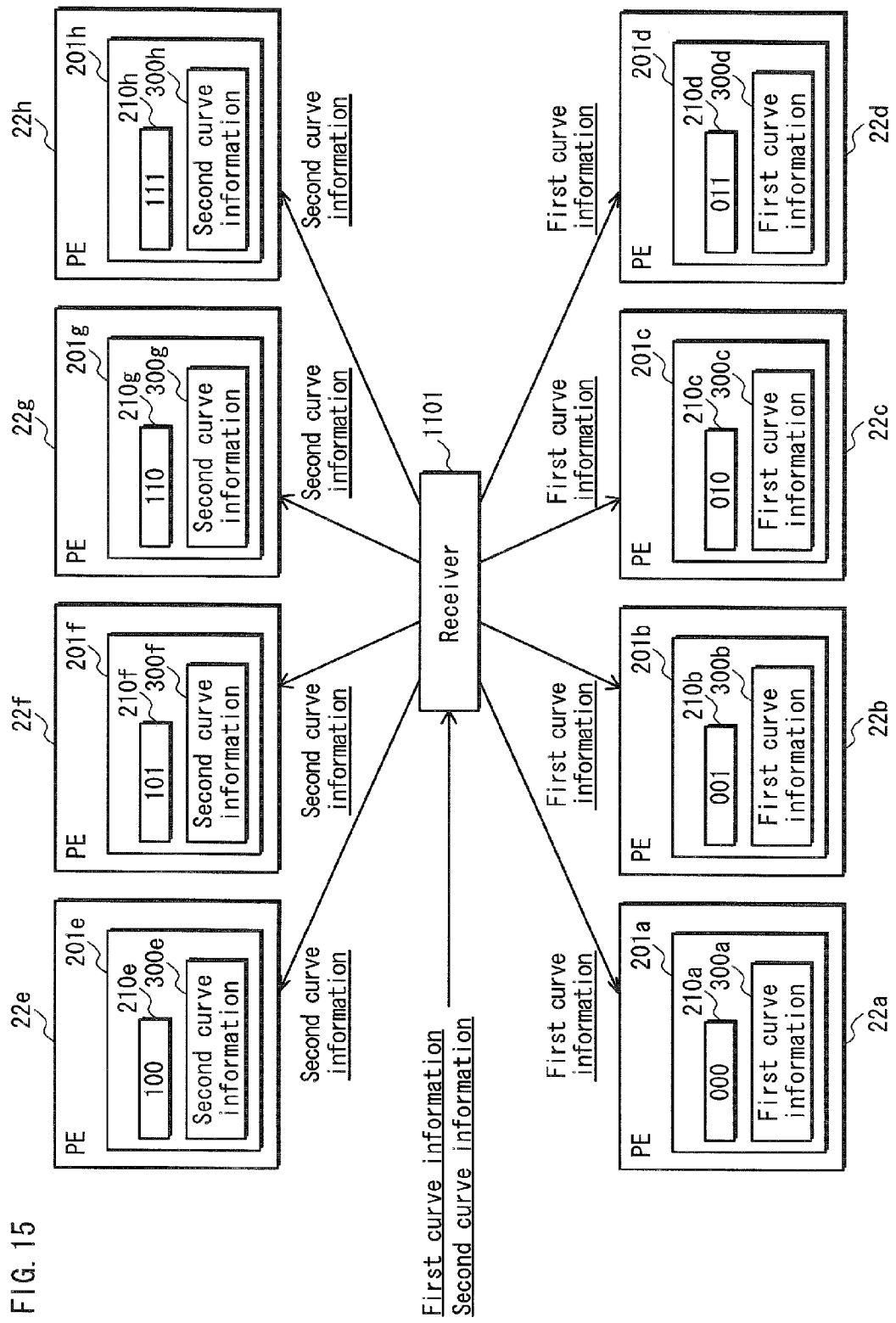
FIG. 15 illustrates a specific example of input memory 201a through 201h.

A specific example of input memory 201a through 201h is given with reference to FIG. 15.

The input memory 201a through 201h of each PE 22a through 22h has an area for storing an ID identifying the PE, as described in Embodiment 1. As shown in FIG. 15, each input memory 201a through 201h respectively stores ID 000, 001, 010, 011, 100, 101, 110, or 111.

Input memory 201a through 201d stores the first curve information output by the CPU 11 and input memory 201e through 201h store the second curve information output by the CPU 11 before the execution of the coarse division program 110.

According to this configuration, PEs 22a through 22d operate as first processor group while PEs 22e through 22h operate as a second processor group, each performing division of a different Bézier curve.

Accordingly, when there is a greater number of processor elements available than curve divisions required, the receiver 1101 inputs different curve information to each processor element group, provided that a plurality of processor elements are configured to operate as a processor element groups and that multiple such groups are available. Thus, not only is the parallelism of all processor elements in a given processor element group put to use but processing may also be performed simultaneously on multiple Bézier curves. This has the merit of quickly providing small line segments that approximate the Bézier curve.

3. Embodiment 3

Embodiment 3 of the present invention is described below, with reference to the accompanying drawings. The following explanation centers on points of difference from Embodiment 1.

All devices, circuits, and components identical to those of Embodiment 1 use the same reference numbers thereas.

3.1 Configuration

Figure 16:
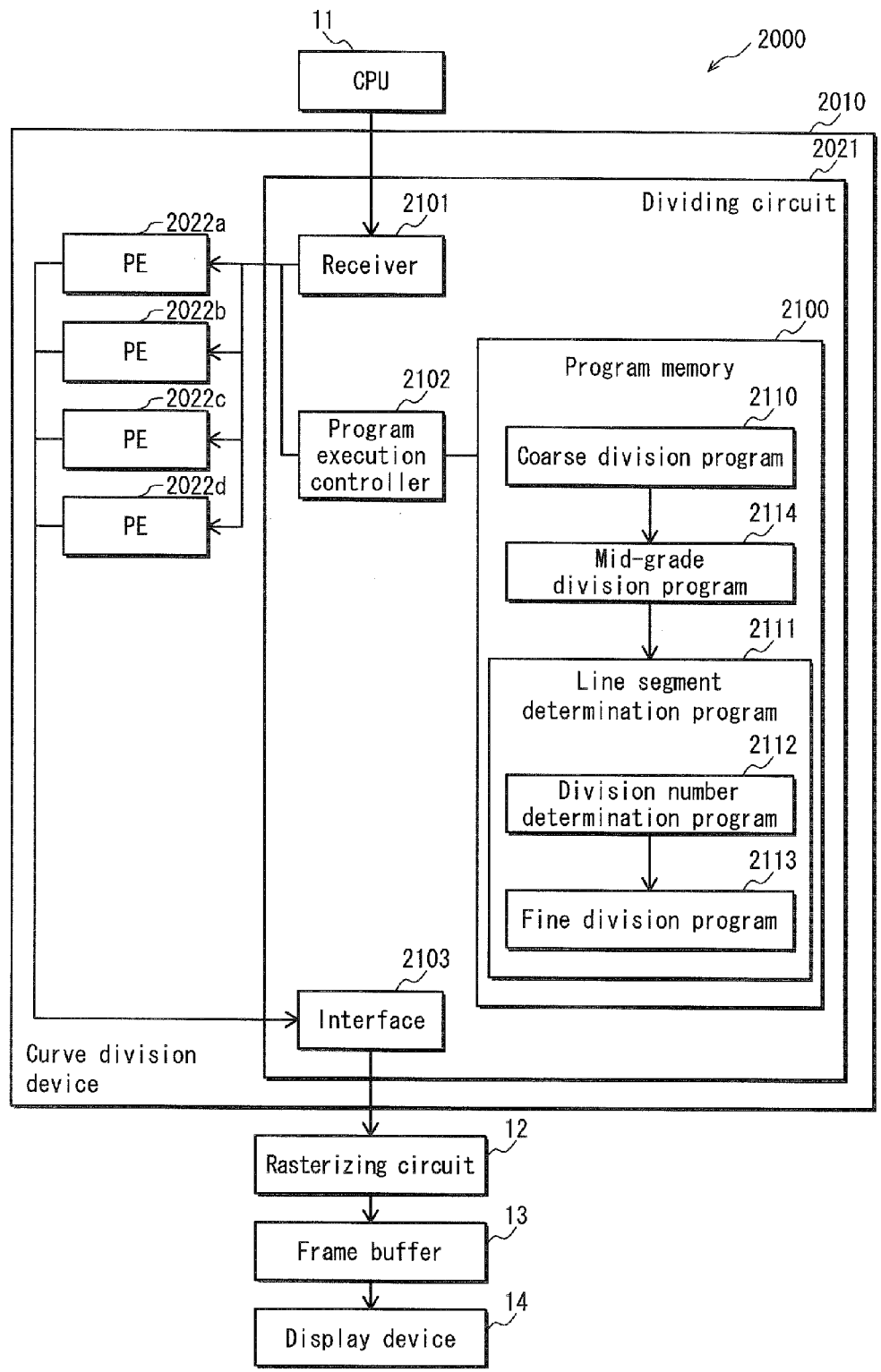
FIG. 16 is block diagram showing the configuration of an information processing device 2000.

FIG. 16 is a block diagram illustrating the configuration of an information processing device 2000 for Embodiment 3 of the present invention.

The information processing device 2000 includes a curve division device 2010, the CPU 11, the rasterizing circuit 12, the frame buffer 13, and the display device 14. In the present Embodiment, the curve division device 2010 has a SIMD configuration identical to that of Embodiment 1.

As shown in FIG. 16, the curve division device 2010 includes a dividing circuit 2021 and PEs 2022a through 2022d.

(1) Dividing Circuit 2021

The dividing circuit 2021 is made up of a program memory 2100, a receiver 2101, a program execution controller 2102, and an interface 2103.

The receiver 2101, the program execution controller 2102, and the interface 2103 are identical to the receiver 101, the program execution controller 102, and the interface 103 of Embodiment 1. Explanations thereof are thus omitted.

(1-1) Program Memory 2100

As shown in FIG. 16, the program memory 2100 includes a coarse division program 2110, a line segment determination program 2111, and a mid-grade division program 2114. The coarse division program 2110, the mid-grade division program 2114, and the line segment determination program 2111 are executed in the stated order.

The coarse division program 2110 is identical to the coarse division program 110 discussed in Embodiment 1. Explanations thereof are therefore omitted.

(Mid-Grade Division Program 2114)

The mid-grade division program 2114 recursively divides each of the coarse divided curves generated by the execution of the coarse division program 2110 and ultimately selected by the PEs in two, performing the number of divisions corresponding to the number in the corresponding PE register so as to produce a plurality of mid-grade divided curves. The mid-grade division program 2114 then passes curve information corresponding to each mid-grade divided curve to the line segment determination program 2111.

(Line Segment Determination Program 2111)

As shown in FIG. 16, the line segment determination program 2111 is made up of the division number determination program 2112 and the fine division program 2113, executed in the stated order.

The division number determination program 2112 determines a number of divisions to be made on each of the mid-grade divided curves generated through execution of the mid-grade division program 2114. The number of divisions is determined as described for the division number in Embodiment 1. The explanation thereof is therefore omitted.

The fine division program 2113 divides each of the mid-grade divided curves generated through execution of the mid-grade division program 2114 into line segment approximations according to the division number determined through the execution of the division number determination program 2112. The method of division into line segment approximation is as described in Embodiment 1. The explanation thereof is therefore omitted.

(2) PEs 2022a through 2022d

The following describes the PEs 2022a through 2022d. Given that the PEs 2022a through 2022d are identically configured, the following describes PE 2022a, only.

Figure 17:
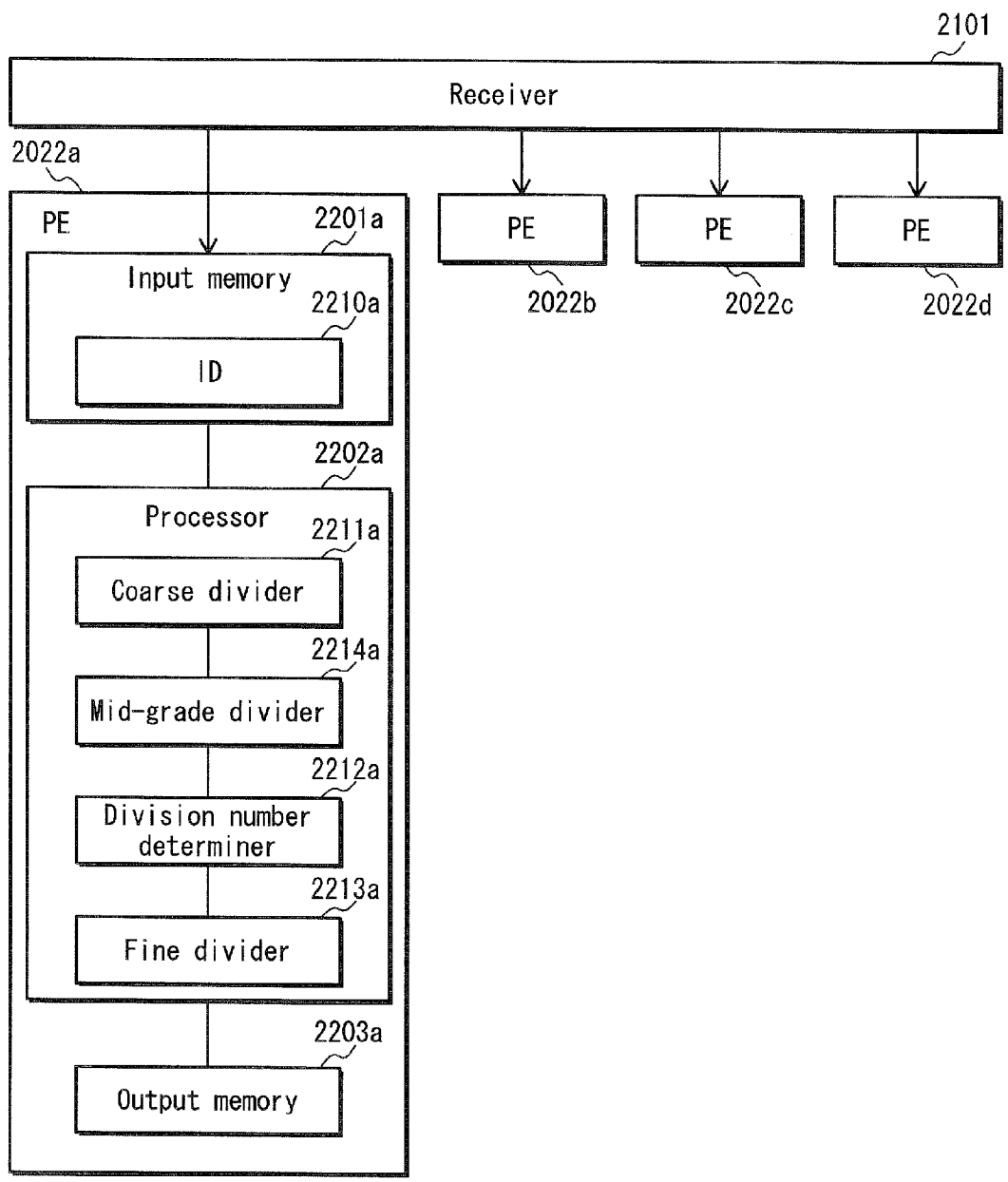

FIG. 17 illustrates the configuration of the PE 2022a. As shown, the PE 2022a includes an input memory 2201a, a processor 2202a, and an output memory 2203a.

(2-1) Input Memory 2201a and Output Memory 2203a

Given that the input memory 2201a and the output memory 2203a are configured identically to the input memory 201a and the output memory 203a described in Embodiment 1, explanations thereof are omitted.

(2-2) Processor 2202a

The processor 2202a executes the program instructions output by the program execution controller 2102.

Specifically, the processor 2202a includes a coarse divider 2211a, a division number determiner 2212a, a fine divider 2213a, and a mid-grade divider 2214a as functional components.

(Coarse Divider 2211a)

The coarse divider 2211a is identical to the coarse divider 211a discussed in Embodiment 1. Explanations thereof are therefore omitted.

(Mid-grade Divider 2214a)

The mid-grade divider 2214a is a functional component executing mid-grade division program 2114 instructions as output by the program execution controller 2102.

Ordinarily, for every Bézier curve divided in two, three areas are required to store at least the start point, end point, and control point, thereby storing the curve information of the divided curve.

When at least $3 \times 2^n$ registers are available in the PE 2022a, the mid-grade divider 2214a calculates a division number for the coarse divided curve according to the number of registers. Specifically, the mid-grade divider 2214a repeats the calculation $\log_2(2^n)$ times.

Upon determining the number of repetitions, the mid-grade divider 2214a takes a coarse divided curve as initial input and performs the determined number of divisions thereon, thus generating $2^n$ divided curves.

(Division Number Determiner 2212a)

The division number determiner 2212a is a functional component executing division number determination program 2112 instructions as output by the program execution controller 2102. The division number determiner 2212a executes the division number determination program 2112 to determine the division number DIV for each of the $2^n$ divided curves generated by the mid-grade divider 2214a. The division number DIV corresponds to at least one of a fixed value and coordinates of a point on the curve.

The division number determiner 2212a transfers the calculated division number DIV to the fine divider 2213a, i.e., passes the division number DIV to the fine division program 2113.

The number of divisions is determined as described for the division number in Embodiment 1. The explanation thereof is therefore omitted.

(Fine Divider 2213a)

The fine divider 2213a is a functional component executing fine division program 2113 instructions as output by the program execution controller 2102. The fine divider 2213a divides each divided curve into a line segment approximation in accordance with the division number determined by the division number determiner 2212a.

The method of division into line segment approximations is as described in Embodiment 1. The explanation thereof is therefore omitted.

3.2 Operations

The following describes the operations of the curve division device 2010.

(1) Coarse Division Process Operations

Given that the operations of the coarse division process for the present Embodiment are realizable as indicated by the flowchart of FIG. 5, explanations thereof are omitted.

(2) Mid-grade Division Process Operations

The following describes the operations of the PEs 2022a through 2022d performing a mid-grade division process of executing μ-code (the mid-grade division program 2114) to divide the divided curves ultimately selected in the coarse division process.

The mid-grade division process divides the curve input thereto in two, operating in the same division order as the coarse division process (see steps S15 and S20 of FIG. 5).

The mid-grade division process differs from the coarse division process, which selects between two divided curves according to the least-significant bit of the ID, in that both of the divided curves are re-divided. In other words, registers are set with the curve information indicating each of the two divided curves (particularly the start point, end point, and control point thereof). Both divided curves are then re-divided. This operation is repeated a number of times determined according to the number of registers. For example, when the registers number $3\times2^n$ as described above, the number of repetitions is n.

(3) Mid-grade Division Process: Concrete Example

The following describes the mid-grade division process through a concrete example.

The mid-grade division process, i.e., the mid-grade division program 2114 as executed by the mid-grade divider 2214a, generates a plurality of mid-grade divided curves by recursively dividing one coarse divided curve selected by the coarse divider 2211a, performing a number of repetitions corresponding to the number of registers.

For example, given registers A, B, and C storing the curve information (the start point, control point, and end point) indicating the coarse divided curve generated by the coarse divider 2211a, the mid-grade divider 2214a requires six registers to make a further division in two. The six registers are D0 (=A), E0 (=B), F0 (=C), D1, E1, and F1. In brief, the division requires a doubling of registers. When 16 registers are available for use, two recursive divisions are performable using 12 of the registers (6 registers for the first recursive division and 12 for the second). By performing two recursive divisions, one processor element generates four mid-grade divided curves.

(4) Line Determination Process

The following describes the operations of the PEs 2022a through 2022d performing a division number determination process of executing μ-code (the line segment determination program 2111) to divide the divided curves ultimately selected in the mid-grade division process.

The division number determination process included in the line determination process, i.e., the division number determiner 2212a executing the division number determination program 2112 to realize the division number determination process, determines the number of divisions to be made on each of the mid-grade divided curves generated by the mid-grade divider 2214a. The determination method is realized by applying Math. 3 given in Embodiment 1 to each mid-grade divided curve.

The fine division process included in the line determination process, i.e., the fine divider 2213a executing the fine division program 2113 by realizing the fine division process, divides each of the mid-grade divided curves into line segment approximations according to the number of divisions determined by the division number determiner 2212a. The line segment approximation generation method is as described in Embodiment 1. The explanation thereof is therefore omitted.

3.3 Conclusion

According to the present configuration, coarse divided curves are recursively divided when a greater number of processor elements are available. This enables the fine division process, which is not suited to multiprocessors, to be minimized while quickly providing a plurality of small line segments that approximate the Bézier curve from a single input curve.

4. Variations

While the above description is given with respect to the Embodiments, the present invention is not limited in this manner. The following variations are also possible.

(1) In the above-described Embodiments, each PE stores a predetermined ID. However, the present invention is not limited in this manner.

The ID allocated to a PE may also be output by the CPU 11 through the receiver as input data.

(2) In the above-described Embodiments, the division number is determined by the division number determination program using Math. 3. However, the present invention is not limited in this manner.

The division number may also be determined as follows.

Given a quadratic Bézier curve made up of a start point coordinate (X0, Y0), a control point coordinate (X1, Y1), and an end point coordinate (X2, Y2), the indices of the division number DIV may be obtained by taking the length of a line segment joining points M and S as the coefficient. Here, point M is the midpoint of the curve and point S is the midpoint of a line segment joining the start point and the end point of the curve.

Alternatively, a maximum value for the indices of the division number DIV may be found by taking the simulated length of two line segments, one joining the start point and the control point and the other joining the end point and the control point. For example, the value of DIVF computed by Math. 5, below, may be converted into an integer and used as the division number DIV.

$$\mathrm{DIV}F=\mathrm{Max}((\mathrm{Abs}(X1-X0)+\mathrm{Abs}(Y1-Y0))/2,(\mathrm{Abs}(X1-X2)+\mathrm{Abs}(Y1-Y2))/2)) \qquad \text{[Math. 5]}$$

Also, DIV may be set to a fixed value, thus reducing computation costs. For example, when the maximum and minimum coordinate values for a curve are known, the area of a rectangle (boundary box) defined by the maximum and minimum coordinate values may be computed. When the value of the area is smaller than the fixed value (threshold), DIV=1 (i.e., no further divisions are made). When the value of the area is greater than the fixed value, DIV=the division number. As such, the cost of computing DIV is reduced. The above describes an example of DIV computation, and no limitation is intended thereby. The division number DIV may also be computed using parameters indicated by the coordinates of the curve, or using fixed values.

(3) In the above-described Embodiments, the PEs have a SIMD configuration. However, the present invention is not limited in this manner. The PEs may also have a MIMD (Multiple Instruction, Multiple Data) configuration.

(4) In Embodiment 2, described above, every PE has a different ID. However, the present invention is not limited in this manner.

ID duplication is allowable between different processor element groups, as long as the PEs are uniquely identifiable within a given processor element group. For example, PE $22a$ and PE $22b$ belong to the same processor element group and must therefore have different, non-duplicated IDs. However, PE $22a$ and PE $22e$ do not belong to the same processor element group and may therefore have identical IDs.

Furthermore, the number of repetitions n may be set such that the n least-significant bits of the ID are valid bits.

(5) In the above-described Embodiments, coarse division involves shifting the bit sequence of the ID to the right. However, the present invention is not limited in this manner.

For example, when the most-significant bit is being referenced, a shift to the left is appropriate.

Furthermore, a specific bit other than most-significant and least-significant bits may be referenced. In such cases, rotation to the right or to the left may be performed.

(6) In the above-described Embodiments, the curve division device divides a quadratic Bézier curve. However, the present invention is not limited in this manner.

The curve division device may also divide a cubic Bézier curve.

Figure 18:
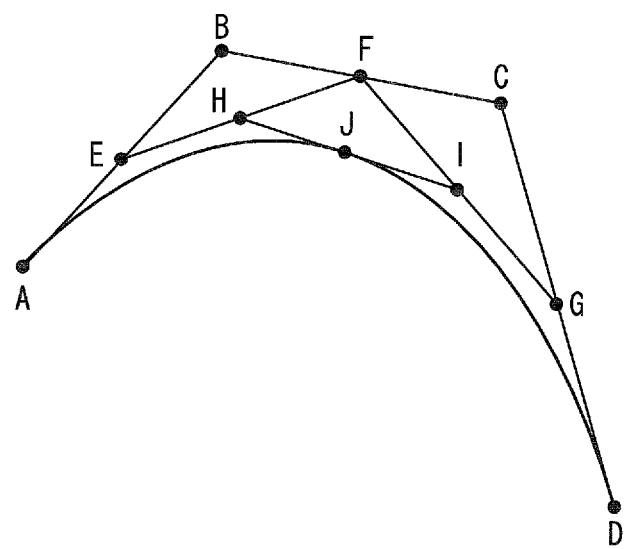
FIG. 18 illustrates a specific example of a cubic Bézier curve being divided in two.
Figure 19:
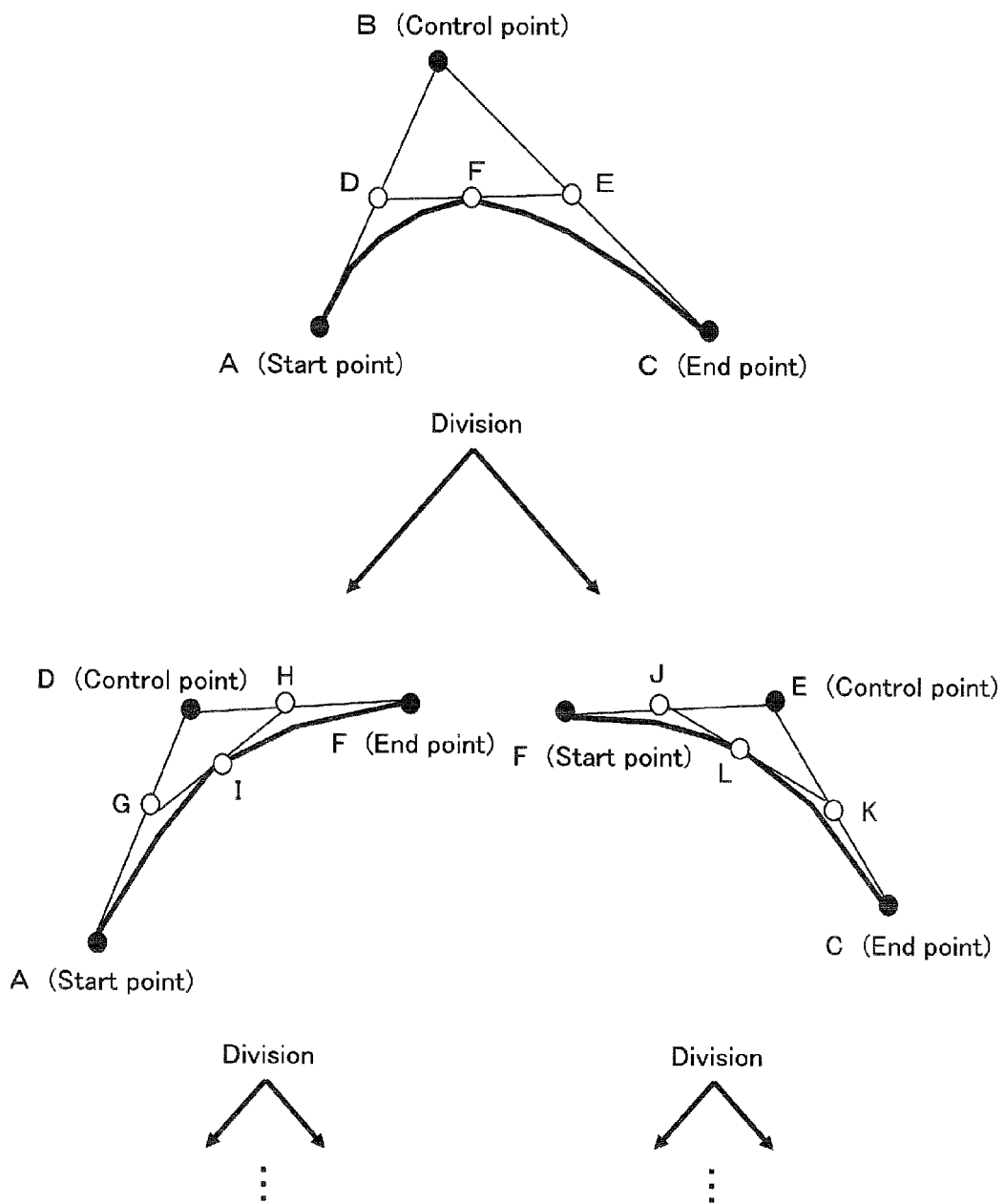
FIG. 19 illustrates a specific example of a conventional method for dividing a quadratic Bézier curve in two.

In such a case, each PE divides the cubic Bézier curve into a plurality of coarse divided curves using the following steps. The following applies to the four points illustrated by FIG. 18, namely start point A, control points B and C, and end point D.
(Step 1) Calculate midpoints E, F, and G of line segments AB, BC, and CD.
(Step 2) Calculate midpoints H and I of line segments EF and FG.
(Step 3) Calculate midpoint J of line segment HI.
(Step 4) According to the least-significant bit of the ID, select one of (i) the cubic Bézier curve defined by points A, E, H, and J, or (ii) the cubic Bézier curve defined by points J, I, G, and D.
(Step 5) Perform a number of repetitions of steps 1 through 4 equal to the base-2 logarithm of the number of processor elements.

According to these steps, each PE comes to store a different coarse divided curve (cubic Bézier curve).

The following steps are applicable to the computation of line segment approximations in a manner similar to Embodiment 1, above.

(7) In the above-described Embodiments, processor elements $22a$ through $22d$ perform fine division only on curves assigned thereto. However, the present invention is not limited in this manner.

The processor elements may exchange data such that two or more processor elements perform fine division on a common curve.

The following describes a specific example, with reference to the accompanying drawings. The following example centers on points of difference from Embodiment 1. All circuits and components identical to those of Embodiment 1 use the same reference numbers thereas.

Figure 20:
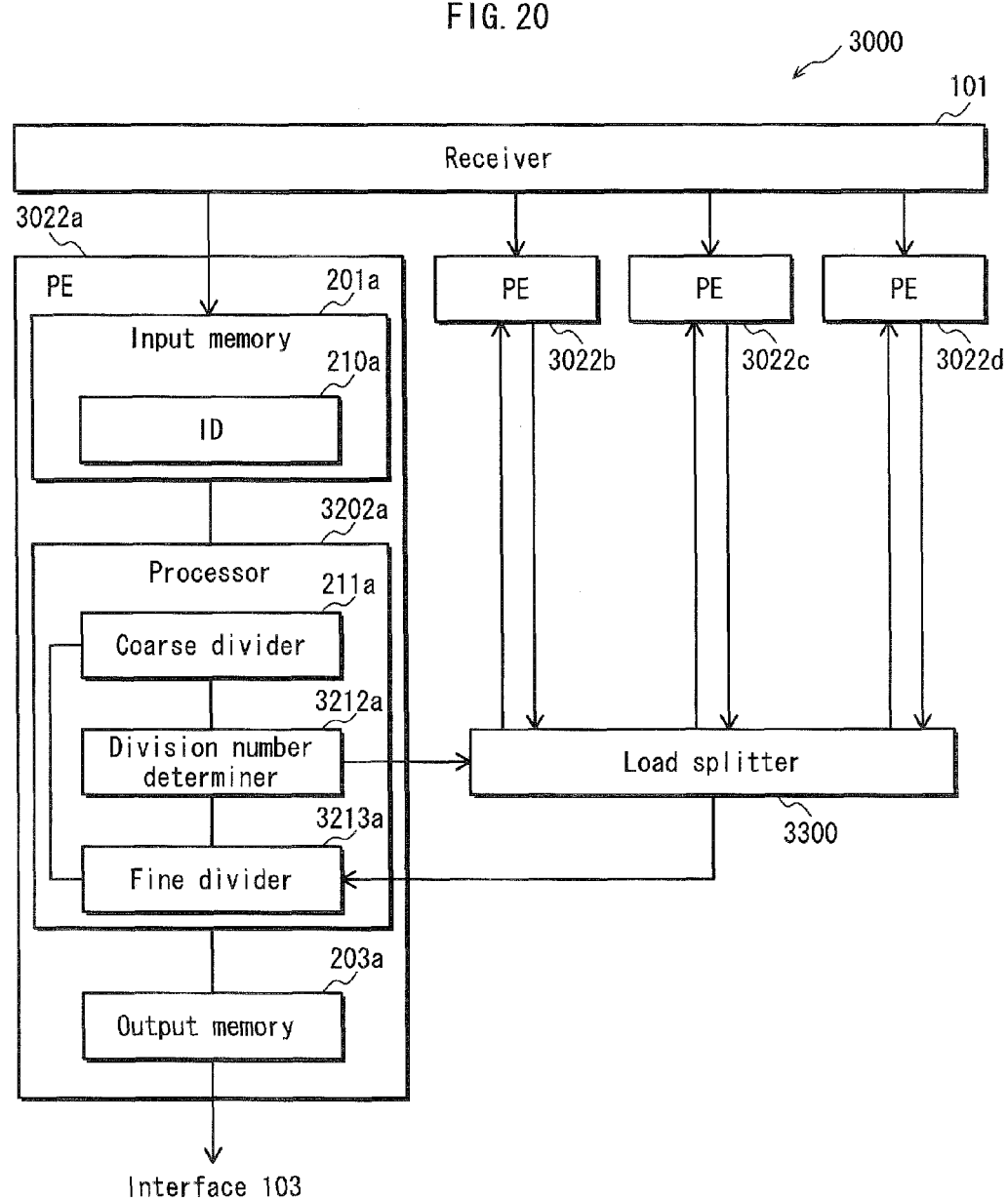
FIG. 20 is block diagram showing the configuration of curve division device 3000.

(7-1) FIG. 20 illustrates the configuration of a curve division device 3000 pertaining to the present variation. Although not indicated, the curve division device 3000 includes a dividing circuit in the receiver 101, much like that of Embodiment 1. The present variation has a SIMD configuration similar to that of Embodiment 1.

The present variation differs from Embodiment 1 in the inclusion of a load splitter 3300. Due to the addition of the load splitter 3300, PE 3022*a* operates unlike Embodiment 1, and includes a division determiner 3212*a* and a fine divider 3213*a*. The same applies to PEs 3022*b* through 3022*d*, which also include the division determiner 3212*a* and the fine divider 3213*a*, and operate identically to PE 3022*a*.

(Load Splitter 3300)

The load splitter 3300 specifies one PE among PEs 3022*a* through 3022*d* as not performing the fine division process. The specified PE is instructed to perform division on the coarse divided curve undergoing division along with the PEs performing the fine division process.

Specifically, the load splitter 3300 receives, from each PE 3022*a* through 3022*d*, the division number calculated by the PE, the curve information indicating the coarse divided curve divided by the PE, and division information made up of the ID indicating the PE.

According to the division information received, the load splitter 3300 then specifies a PE having a division number equal to or less than one. The load splitter 3300 then transmits the curve information indicating the coarse divided curve processed by the PE having the greatest division number, along with the corresponding division number, to the specified PE.

Here, one PE having a division number equal to or less than one is specified . . . . However, two or more PEs may also be specified. In such cases, the curve information indicating the coarse divided curve processed by a single PE may be transmitted, along with the corresponding division number, to all of the two or more specified PEs. Alternatively, the curve information indicating the coarse divided curve processed by a different PE may be transmitted, along with the corresponding division number, to each of the two or more specified PEs.

As such, the present variation enables monitoring of the division number for all processor elements, thus allowing load splitting for fine division in a manner maximizing the benefits of SIMD processor parallelism.

(Division Number Determiner 3212*a*)

In addition to the functions of the division number determiner 212*a* described in Embodiment 1, the division number determiner 3212*a* outputs division information made up of the computed division number (DIV), the curve information indicating the coarse divided curve to be divided, and the ID stored in the input memory 201*a* to the load splitter 3300.

(Fine Divider 3213*a*)

When the division number computed by the division number determiner 3212*a* of PE 3022*a* is two or greater, the fine divider 3213*a* performs a process identical to that described for the fine divider 213*a* of Embodiment 1.

Upon receiving the division number calculated by the other PEs and the curve information from the load splitter 3300, the fine divider 3213*a* divides the coarse divided curve indicated by the received curve information in accordance with the received division number.

Accordingly, when high curvature remains after coarse division by the PEs, PEs not needed for fine division are used in the execution of the processing by the PEs executing the fine division process. Thus, the parallelism of the processor elements is put to use, which has the merit of quickly providing small line segments that approximate the Bézier curve.

(7-2) While the above-described variation describes a single load splitter 3300 monitoring all PEs, another variation is also possible.

Figure 21:
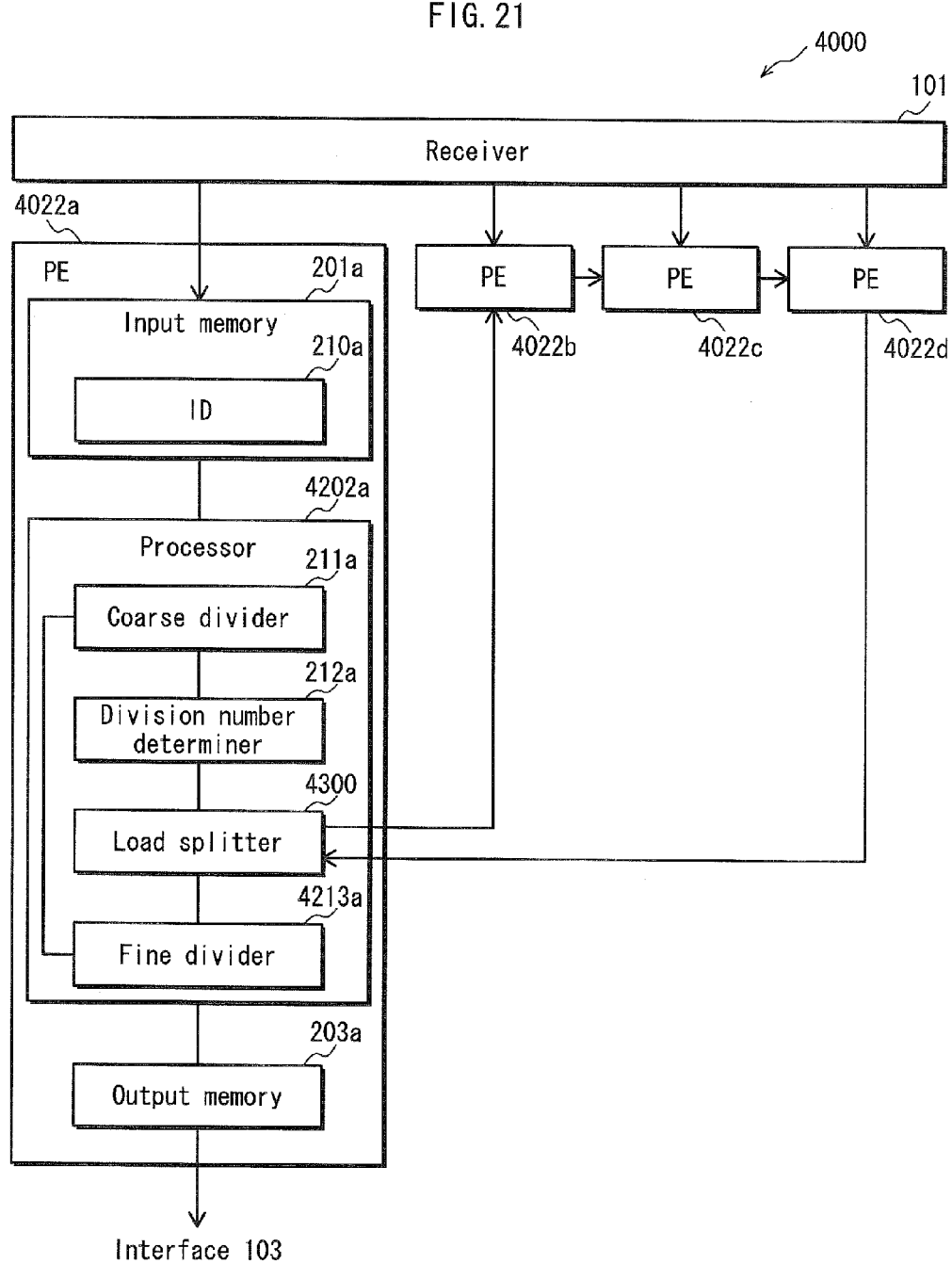
FIG. 21 is block diagram showing the configuration of curve division device 4000.

FIG. 21 illustrates the configuration of a curve division device 4000 pertaining to the present variation. Although not indicated, the curve division device 4000 includes a dividing circuit in the receiver 101, much like that of Embodiment 1. The present variation has a SIMD configuration similar to that of Embodiment 1.

The present variation differs from Embodiment 1 in the inclusion of a load splitter 4300 in each PE. Due to the addition of the load splitter 3300, PE 4022a operates unlike Embodiment 1, and includes a fine divider 4213a. The same applies to PEs 4022b through 4022d, which also include a division determiner 4212a and operate identically to PE 3022a.

(Load Splitter 4300)

The load splitter 4300 monitors the processing load of a neighbouring PE. When the PE to which a given load splitter 4300 belongs is not performing the fine division process and the PE being monitored is performing the fine division process, the load splitter 4300 instructs the fine divider 4213 to divide the coarse divided curve being divided by the PE being monitored.

Specifically, the load splitter 4300 monitors the division number of the neighbouring processor element. In this example, PE 4022a monitors PE 4022d, PE 4022b monitors PE 4022a, PE 4022c monitors PE 4022b, and PE 4022d monitors PE 4022c.

When the division number calculated by the division number determiner 212a is two or greater, the load splitter 4300 of a given PE transmits the division number, the curve information indicating the coarse divided curve to be divided, and the division information made up of the ID of the given PE to the load splitter of the PE monitoring the given PE. For example, the load splitter 4300 of PE 4022a transmits division information to the load splitter of PE 4022b, which is monitoring PE 4022a.

Upon receiving division information from another PE (here, PE 4022d), the load splitter 4300 determines whether the division number computed by the division number determiner 212a is equal to or less than one. In the affirmative case, the load splitter 4300 outputs the curve information obtained by the coarse divider 211a to the output memory 203a and outputs the division information received from the other PE to the fine divider 4213a. In the negative case, i.e., when the division number computed by the division number determiner 212a is two or greater, the load splitter 4300 discards the received division information.

For example, when the division number of the PE 4022a is eight, the load splitter 4300 transmits the division information to the neighbouring processor element (PE 4022b). When the division number of the PE 4022a is one, PE 4022a and PE 4022b perform a single curve division process (dividing the coarse divided curve assigned to PE 4022a). Alternatively, PE 4022a may perform part of the fine division process of the neighbouring processor element (PE 4022d) only when the division number is one.

The above description of monitoring allocation is given as an example. No limitation is intended thereby. For example, a given PE may monitor the two neighbouring PEs on either side thereof.

(Fine Divider 4213a)

When the division number computed by the division number determiner 4212a of PE 4022a is two or greater, the fine divider 4213a performs a process identical to that described for the fine divider 213a of Embodiment 1.

Upon receiving the division number calculated by the other PEs and the curve information from the load splitter 4300, the fine divider 4213a divides the coarse divided curve indicated by the received curve information in accordance with the received division number.

Figure 22:
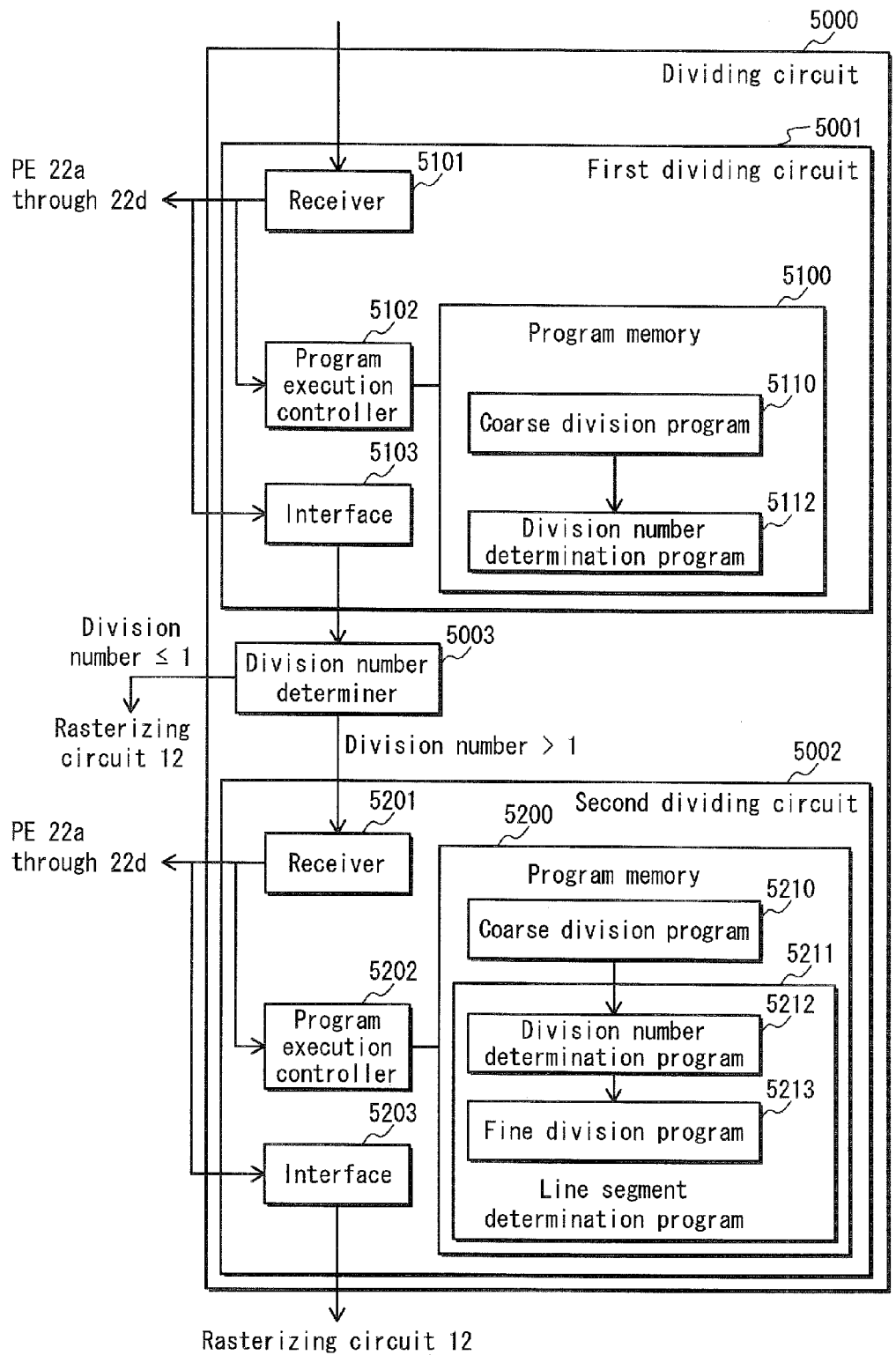
FIG. 22 shows the configuration of a dividing circuit 5000.

(8) The dividing circuit 21 of Embodiment 1, described above, may be replaced by the dividing circuit 5000 illustrated in FIG. 22.

The following describes the dividing circuit 5000. The present variation has a SIMD configuration similar to that of Embodiment 1.

FIG. 22 illustrates the configuration of a dividing circuit 5000 pertaining to the present variation.

As shown in FIG. 22, the dividing circuit 5000 includes a first dividing circuit 5001, a second dividing circuit 5002, and a division number determiner 5003.

(First Dividing Circuit 5001)

The first dividing circuit 5001 includes a program memory 5100, a receiver 5101, a program execution controller 5102, and an interface 5103. The first dividing circuit 5001 causes PEs 22a through 22d to execute coarse division and division number determination as described in Embodiment 1. In other words, the programming of the first dividing circuit 5001 is concluded upon coarse division of the curve input thereto and division number determination are complete.

The program memory 5100 stores a coarse division program 5110 and a division number determination program 5112. The coarse division program 5110 and the division number determination program 5112 are identical to the coarse division program 110 and the division number determination program 112 from the Embodiments. Explanations thereof are thus omitted.

The receiver 5101 is identical to the receiver 101 described in Embodiment 1. The explanation thereof is therefore omitted.

The program execution controller 5102 causes PEs 22a through 22d to execute the coarse division program 5110 and the division number determination program 5112.

The interface 5103 receives the execution results of the coarse division program 5110 and the division number determination program 5112 from each PE 22a through 22d for output to the division number determiner 5003. The execution results are the division number calculated by each PE and division result information made up of the curve information indicating the coarse divided curve.

(Division Number Determiner 5003)

The division number determiner 5003 transfers the curve information to the rasterizing circuit 12 when the division number for the coarse divided curve, given by the division result information output by the PEs 22a through 22d, is less than or equal to one. When the division number is greater than one, the curve information for the coarse divided curve is transferred to the second dividing circuit 5002.

(Second Dividing Circuit 5002)

The second dividing circuit 5002 includes a program memory 5200, a receiver 5201, a program execution controller 5202, and an interface 5203. The second dividing circuit 5002 causes PEs 22a through 22d to execute coarse division, division number determination, and fine division as described in Embodiment 1. In other words, the second dividing circuit 5002 functions identically to the dividing circuit 21 of Embodiment 1. The second dividing circuit 5002 differs from Embodiment 1 in handling the curve divided by the first dividing circuit 5001.

The receiver 5201 outputs the curve information received from the division number determiner 5003 to the PEs 22a through 22d. When several pieces of curve information have been received from the division number determiner 5003, the receiver 5201 sequentially outputs the pieces of curve information. The output timing is dependent on the end of the previous curve information processing.

The program memory 5200 stores a coarse division program 5210 and a line segment determination program 5211 made up of a division number determination program 5212 and a fine division program 5213. The coarse division program 5210, the division number determination program 5212, and the fine division program 5213 are identical to the coarse division program 110, the division number determination program 112, and the fine division program 113 from the Embodiments. Explanations thereof are thus omitted.

The program execution controller 5202 uses the coarse division program 5210, the division number determination program 5212, and the fine division program 5213 in operating identically to the program execution controller 102.

The interface 5203 is identical to the interface 103. As such, the explanation thereof is omitted.

According to the above, a curve not requiring fine division is output to the rasterizing circuit 12 upon division number determination, such that only curves requiring fine division are further divided. Thus, the parallelism of the processor elements is put to use in generating curves having lower curvature. This has the merit of quickly providing small line segments that approximate the Bézier curve.

(9) In the above-described Embodiments, the receiver is typically an integrated circuit realized through LSI. As described above, the coarse divider, division number determiner, fine divider, and mid-grade divider are also typically realized as μ-code operating on the processor elements, which are part of the integrated circuit realized through LSI.

The receiver and the processor elements may each be realized as a single chip, or may be included in whole or in part on a common chip. Although LSI is mentioned above, the term IC, system LSI, super LSI, or ultra LSI may be used according to the degree of integration. Further, the integration method is not limited to LSI. The integrated circuit may also be realized as a private circuit or a general-purpose SIMD processor After LSI manufacture, a FPGA (Field Programmable Gate Array) or a reconfigurable processor within the LSI may also be used. Further still, advances and discoveries in semiconductor technology may lead to a new technology replacing LSI. The present invention may, of course, be applied to such future functional block technology. The application of biotechnology and the like is also plausible.

(10) A program including the method and steps described in the above Embodiments may be stored in memory for execution by a CPU or similar reading the program. The above-described method is thus realized by the execution of the program.

Alternatively, the program including the method and steps may be stored on a recording medium for distribution.

(9) The above-described Embodiments and variations may be freely combined.

5. Supplement (1) In one aspect of the present invention, a curve division device comprises: at least N (N≥2, N being an integer) processor elements each having a different setting value assigned thereto; a reception unit receiving curve information indicating a Bézier curve from an outside source; a first execution unit causing each of the N processor elements to execute a division algorithm of taking the curve information as initial input data and repeatedly (i) generating two divided curves by dividing the Bézier curve indicated by the input data, (ii) selecting one of the two divided curves in accordance with the setting value assigned thereto, and (iii) defining new input data indicating the divided curve thus selected for subsequent division, until the divided curve selected by each of the N processor elements is different; and a second execution unit causing each of the N processor elements to execute a determination algorithm of determining one or more line segments approximating an ultimately selected divided curve resulting from the division algorithm.

According to the above-described configuration, the curve division device causes N processor elements to execute the division algorithm until a different divided curve is selected by each processor element. As such, once execution is complete, the processor elements have each selected a divided curve of lower curvature than the Bézier curve indicated in the initial input. Therefore, each processor element determines one or more line segments approximating a low-curvature divided curve, thus preventing processing load imbalance. Accordingly, the curve division device is able to perform efficient division processing on Bézier curves within the multi-processor system.

(2) Here, the first execution unit and the second execution unit respectively cause the N processor elements to execute the division algorithm and the determination algorithm by exploiting SIMD program parallelism.

Accordingly, given that the first execution unit and the second execution unit of the curve division device respectively cause the N processor elements to execute the division algorithm and the determination algorithm by exploiting SIMD program parallelism, the processor elements are able to simultaneously execute a common algorithm to efficiently perform the division process on Bézier curves.

(3) Also, N is an $n^{th}$ power of two (n being a positive integer), and the division algorithm is repeated n times.

Accordingly, the first execution unit of the curve division device causes $2^n$ processor elements to execute n repetitions of the division algorithm, thus enabling each processor element to reliably select a different divided curve.

(4) Further, the setting value assigned to each processor element is n-bit data uniquely identifying the processor element, and the division algorithm involves selecting one of the divided curves according to a specific bit position in the setting value, shifting a bit sequence indicating the setting value after the selection to create a new bit sequence, and using the new bit sequence for a subsequent selection.

Accordingly, the first execution device of the curve division device causes each processor element to shift the n-bit data sequence while using the specific bit position to select a divided curve. As such, a different divided curve is reliably selected over n repetitions.

(5) Furthermore, the input data includes point A as a start point, point B as a control point, and point C as an end point for the Bézier curve, the division algorithm involves: calculating point D as midpoint of line segment AB and point E as midpoint of line segment BC, and calculating point F as midpoint of line segment DE joining point D and point E; thereby dividing the Bézier curve defined by points A, B, and C into (i) a first divided curve defined by point A as the start point, point F as the end point, and point D as the control point, and (ii) a second divided curve defined by point F as the start point, point C as the end point, and point E as the control point.

Accordingly, the first execution unit easily causes the processor elements to divide the curve using the start point, the control point, and the end point.

(6) Further still, the first execution unit further causes each of M (M≥2, M being an integer) processor elements not counted in the N processor elements to execute the division algorithm, taking other curve information indicating another Bézier curve as initial input data, and the second execution unit further causes each of the M processor elements to execute the determination algorithm.

Accordingly, the curve division device divides different Bézier curves assigned as input data by using a group of N processor elements and a group of M processor elements, in parallel.

(7) Also, the division algorithm requires L registers to store information indicating the ultimately selected divided curve, the N processor elements each include at least $L \times 2^n$ registers (n being a positive integer), the second execution unit causes each of the N processor elements to execute n repetitions of a re-division algorithm before causing the N processor elements to execute the determination algorithm, the re-division algorithm taking the curve information indicating the ultimately selected divided curve as the initial input data, and the determination algorithm involves determining one or more line segments approximating each of one or more ultimately selected curves resulting from the re-division algorithm.

Accordingly, the second execution unit of the curve division device causes each processor element to execute the re-division algorithm on the selected divided curves resulting from the division algorithm before applying the determination algorithm. As such, fine divided curves are obtained, enabling the determination algorithm to determine line segments more efficiently.

(8) In addition, the determination algorithm involves: calculating a division number based on divided curve information indicating the ultimately selected divided curve, the division number being a number obtained by dividing the divided curve in accordance with a curvature thereof; dividing the divided curve according to the division number thus calculated; and determining one line segment approximating each curve thus divided.

Accordingly, the curve division device divides the divided curve into one or more curves according to the curvature and determines a line segment approximating the divided curve. As such, the line segment thus determined can reliably be used to approximate the divided curve.

(9) Also, when the second execution unit identifies, through the division number calculation, a given processor element not required to perform division, and the given processor element specifies another processor element identified as required to perform division, the second execution unit causes the given processor element and the other processor element to divide the ultimately selected divided curve of the other processor element according to the division number calculated thereby.

Accordingly, when the curvature remains high despite division, the first execution unit of the curve division device controls the processor elements such that a processor element not required to perform division divides a divided curve of another processor element when the other processor element is required to perform division. Accordingly, the curve division device applies the parallelism of the processor elements to quickly approximate the Bézier curve with small line segments.

(10) Additionally, the second execution unit outputs the curve information indicating any divided curve identified through division number calculation as not requiring division, and the second execution unit causes the N processor elements to (i) execute n repetitions of a re-division algorithm before dividing according to the calculated division number, the re-division algorithm taking the curve information indicating any divided curve identified through division number calculation as requiring division as initial input data, and (ii) repeat the determination algorithm after executing the re-division algorithm.

Accordingly, before the second execution unit performs line segment approximation, the curve division device re-divides any divided curve requiring further division. Thus, the curve processed by the processor elements when the second execution unit performs line segment approximation has lower curvature, allowing the Bézier curve to be quickly approximated by small line segments.

INDUSTRIAL APPLICABILITY

The curve division device pertaining to the present invention is applicable to vector graphics display methods, such as those used in outline fonts employed by mobile phones, televisions, and other devices implementing a multiprocessor configuration.

REFERENCE SIGNS LIST

1 Information processing device
10 Curve division device
11 CPU
12 Rasterizing circuit
13 Frame buffer
14 Display device
21 Dividing circuit
22a-22d Processor elements
100 Program memory
101 Receiver
102 Program execution controller
103 Interface
110 Coarse division program
111 Line segment determination program
112 Division number determination program
113 Fine division program
201a-201d Input memory
202a Processor
203a Output memory
211a Coarse divider
212a Division number determiner
213a Fin divider

The invention claimed is:

1. A curve division device for use in producing an outline font, said curve division device comprising: a plurality of processor elements;
   a reception unit receiving input data of curve information and distributing the curve information to each of the processor elements; a program storage unit; and
   an execution unit causing each of the processor elements to execute a plurality of programs stored in the program storage unit, wherein the programs stored in the program storage unit include a rough division program and a segment determination program, the rough division program and the segment determination program are executed by each of the processor elements, the rough division program involves generating two divided curves by dividing a curve indicated by the curve information in the input data, selecting one of the two divided curves in accordance with a value of a specified digit in a processor element ID, and repeating the generation of the two divided curves, a shift of the digit in the processor element ID, and the selection of the divided curve until the divided curve selected by each of the processor elements is different, the segment determination program includes a segment number determination program and a fine division program, the segment number determination program involves determining, for each of the divided curves ultimately selected as a result of executing the rough division program, a number of divisions of a given divided curve according to a degree of curvature of the divided curve, and the fine division program involves re-dividing the given divided curve in accordance with the number of divisions determined according to the degree of curvature, and approximating each line segment obtained by the re-dividing, wherein each line segment obtained by the re-dividing is used to produce the outline font.

2. The curve division device of claim 1, wherein
the processor elements are N in number, where N is an nth power of two (n being a positive integer), and
the rough division program is repeated n times.

3. The curve division device of claim 2, wherein
the ID assigned to each processor element is n-bit data uniquely identifying the processor element, and
the rough division program involves selecting one of the divided curves according to a specific bit position in the ID, shifting a bit sequence indicating the ID after the selection to create a new bit sequence, and using the new bit sequence for a subsequent selection.

4. The curve division device of claim 1, wherein
the input data includes point A as a start point, point B as a control point, and point C as an end point,
the rough division program involves:
  calculating point D as midpoint of line segment AB and point E as midpoint of line segment BC, and calculating point F as midpoint of line segment DE joining point D and point E; and
  thereby dividing a Bezier curve defined by points A, B, and C into (i) a first divided curve defined by point A as the start point, point F as the end point, and point D as the control point, and (ii) a second divided curve defined by point F as the start point, point C as the end point, and point E as the control point.

5. The curve division device of claim 1, wherein
the execution unit further causes each of M (M≥2, M being an integer) processor elements not counted in the N processor elements to execute the rough division program, taking other curve information indicating another Bézier curve as initial input data, and
the execution unit further causes each of the M processor elements to execute the segment number determination program.

6. The curve division device of claim 1, wherein
the rough division program requires L registers to store information indicating the ultimately selected divided curve,
the N processor elements each include at least L×$2^n$ registers (n being a positive integer),
the execution unit causes each of the N processor elements to execute n repetitions of the rough division program before causing the N processor elements to execute the segment number determination program, the fine division program taking the curve information indicating the ultimately selected divided curve as initial input data, and
the segment number determination program involves determining one or more line segments approximating each of one or more ultimately selected curves resulting from the rough division program.

7. The curve division device of claim 1, wherein the segment number determination program involves:
calculating a division number based on divided curve information indicating the ultimately selected divided curve, the division number being a number obtained by dividing the divided curve in accordance with a curvature thereof;
dividing the divided curve according to the division number thus calculated; and
determining one line segment approximating each curve thus divided.

8. The curve division device of claim 7, wherein
when the execution unit identifies, through the division number calculation, a given processor element not required to perform division, and the given processor element specifies another processor element identified as required to perform division,
the execution unit causes the given processor element and the other processor element to divide the ultimately selected divided curve of the other processor element according to the division number calculated thereby.

9. The curve division device of claim 7, wherein
the execution unit outputs the curve information indicating any divided curve identified through division number calculation as not requiring division, and
the execution unit causes the N processor elements to (i) execute n repetitions of a rough division program before dividing according to the calculated division number, the rough division program taking the curve information indicating any divided curve identified through division number calculation as requiring division as initial input data, and (ii) repeat the segment number determination program after executing the fine division program.

10. A curve division method used by a curve division device for use in producing an outline font, the curve division device being a computer comprising a plurality of processor elements, a reception unit receiving input data of curve information and distributing the curve information to each of the processor elements, a program storage unit, and an execution unit causing each of the processor elements to execute a plurality of programs stored in the program storage unit, the curve division method being executed by the programs supplied by the program storage unit, wherein the programs stored in the program storage unit include a rough division program and a segment determination program, the rough division program and the segment determination program are executed by each of the processor elements,
the rough division program involves causing the computer to generate two divided curves by dividing a curve indicated by the curve information in the input data, to select one of the two divided curves in accordance with a value of a specified digit in a processor element ID, and to repeat the generation of the two divided curves, a shift of the digit in the processor element ID, and the selection of the divided curve until the divided curve selected by each of the processor elements is different,
the segment determination program includes a segment number determination program and a fine division program, the segment number determination program involves causing the computer to determine, for each of the divided curves ultimately selected as a result of executing the rough division program, a number of divisions of a given divided curve according to a degree of curvature of the divided curve, and the fine division program involves causing the computer to re-divide the given divided curve in accordance with the number of divisions determined according to the degree of curvature, and to approximate each line segment obtained by the re-dividing, wherein each line segment obtained by the re-dividing is used to produce the outline font.

11. A non-transitory recording medium on which is stored a computer-readable curve division program, to be supplied to processor elements in a curve division device for use in producing an outline font, the curve division device being a computer comprising a plurality of the processor elements, a reception unit receiving input data of curve information and distributing the curve information to each of the processor elements, a program storage unit, and an execution unit causing each of the processor elements to execute a plurality of programs stored in the program storage unit, wherein the programs stored in the program storage unit include a rough division program and a segment determination program, the rough division program and the segment determination program are executed by each of the processor elements, the rough division program involves generating two divided curves by dividing a curve indicated by the curve information in the input data, selecting one of the two divided curves in accordance with a value of a specified digit in a processor element ID, and repeating the generation of the two divided curves, a shift of the digit in the processor element ID, and the selection of the divided curve until the divided curve selected by each of the processor elements is different, the segment determination program includes a segment number determination program and a fine division program, the segment number determination program involves determining, for each of the divided curves ultimately selected as a result of executing the rough division program, a number of divisions of a given divided curve according to a degree of curvature of the divided curve, and the fine division program involves re-dividing the given divided curve in accordance with the number of divisions determined according to the degree of curvature, and approximating each line segment obtained by the re-dividing, wherein each line segment obtained by the re-dividing is used to produce the outline font.

12. An integrated circuit for use in producing an outline font, said integrated circuit comprising: a plurality of processor elements; a reception unit receiving input data of curve information and distributing the curve information to each of the processor elements; a program storage unit; and an execution unit causing each of the processor elements to execute a plurality of programs stored in the program storage unit, wherein the programs stored in the program storage unit include a rough division program and a segment determination program, the rough division program and the segment determination program are executed by each of the processor elements, the rough division program involves generating two divided curves by dividing a curve indicated by the curve information in the input data, selecting one of the two divided curves in accordance with a value of a specified digit in a processor element ID, and repeating the generation of the two divided curves, a shift of the digit in the processor element ID, and the selection of the divided curve until the divided curve selected by each of the processor elements is different, the segment determination program includes a segment number determination program and a fine division program, the segment number determination program involves determining, for each of the divided curves ultimately selected as a result of executing the rough division program, a number of divisions of a given divided curve according to a degree of curvature of the divided curve, and the fine division program involves re-dividing the given divided curve in accordance with the number of divisions determined according to the degree of curvature, and approximating each line segment obtained by the re-dividing, wherein each line segment obtained by the re-dividing is used to produce the outline font.

* * * * *